US012699299B2

(12) United States Patent
Kawakami et al.

(10) Patent No.: US 12,699,299 B2
(45) Date of Patent: Aug. 4, 2026

(54) CONTROL CIRCUIT AND OPTICAL CIRCUIT CONTROL METHOD

(71) Applicant: NTT, Inc., Tokyo (JP)

(72) Inventors: Hiroto Kawakami, Musashino (JP);
Yoshiaki Kisaka, Musashino (JP);
Shoichiro Kuwahara, Musashino (JP)

(73) Assignee: NTT, Inc., Tokyo (JP)

( * ) Notice: Subject to any disclaimer, the term of this patent is extended or adjusted under 35 U.S.C. 154(b) by 253 days.

(21) Appl. No.: 18/715,580

(22) PCT Filed: Oct. 17, 2022

(86) PCT No.: PCT/JP2022/038585
§ 371 (c)(1),
(2) Date: May 31, 2024

(87) PCT Pub. No.: WO2023/105930
PCT Pub. Date: Jun. 15, 2023

(65) Prior Publication Data
US 2025/0028217 A1     Jan. 23, 2025

(51) Int. Cl.
*G02F 1/21* (2006.01)
*G02F 1/225* (2006.01)

(52) U.S. Cl.
CPC .............. *G02F 1/212* (2021.01); *G02F 1/225* (2013.01)

(58) Field of Classification Search
CPC ............. G02F 1/01; G02F 1/212; G02F 1/225
See application file for complete search history.

(56) References Cited

U.S. PATENT DOCUMENTS

| | | |
|---|---|---|
| 2015/0277207 A1 | 10/2015 | Fujikata |
| 2016/0020853 A1 | 1/2016 | Akiyama |
| 2018/0173023 A1 | 6/2018 | Streshinsky et al. |

FOREIGN PATENT DOCUMENTS

| | | |
|---|---|---|
| CN | 109581701 A | 4/2019 |
| JP | 2015191068 A | 11/2015 |
| JP | 2016025380 A | 2/2016 |

OTHER PUBLICATIONS

Hiroto Kawakami, et al., "Auto bias control and bias hold circuit for IQ-modulator in flexible optical QAM transmitter with Nyquist filtering" Optics Express, vol. 22, No. 23, pp. 28163-28168, Nov. 2014.

(Continued)

*Primary Examiner* — Jack Dinh
(74) *Attorney, Agent, or Firm* — Harness, Dickey & Pierce, PLC

(57) ABSTRACT

A control circuit controls at least one optical path difference among optical path differences of two optical paths included in a single MZI or each of a plurality of the MZIs included in an optical circuit. The control circuit includes a reference light generation unit, a reference light input unit, an optical power monitor unit, and a controller. The reference light generation unit generates reference light respectively having N types (N is a natural number) of wavelengths different from the wavelength λ of input light input to the optical circuit in parallel or in a time division manner. A reference light input unit inputs the reference light to the optical circuit. The optical power monitor unit monitors a light intensity of propagated input light which is input light that has propagated through the optical circuit, and a light intensity of propagated reference light which is reference light that has propagated through the optical circuit, or a light intensity of light obtained by multiplexing the propagated input light and the propagated reference light. The (Continued)

controller performs control to correct the optical path difference on the basis of the light intensity of the propagated input light and the light intensities of N types of propagated reference light, which are obtained using the monitoring result.

20 Claims, 13 Drawing Sheets

(56) References Cited

OTHER PUBLICATIONS

Hiroto Kawakami, et al., "Proposal and verification of auto calibration technique for bias control circuit connecting to imperfect IQ-modulator", 2019 24th OptoElectronics and Communications Conference (OECC) and 2019 International Conference on Photonics in Switching and Computing (PSC), 2019, ThC2-2, pp. 1-3.

(a) BEFORE OCCURRENCE OF BIAS DRIFT (b) AFTER OCCURRENCE OF BIAS DRIFT

FIG. 12

(a) BEFORE OCCURRENCE OF BIAS DRIFT (b) OCCURRENCE OF BIAS DRIFT #1

(c) OCCURRENCE OF BIAS DRIFT #2

CONTROL CIRCUIT AND OPTICAL CIRCUIT CONTROL METHOD

CROSS-REFERENCE TO RELATED APPLICATIONS

This application is a 371 U.S. National Phase of International Application No. PCT/JP2022/038585, filed on Oct. 17, 2022, which claims priority to International Application No. PCT/JP2021/044767, filed on Dec. 6, 2021. The entire disclosures of the above applications are incorporated herein by reference.

TECHNICAL FIELD

The present invention relates to a control circuit and an optical circuit control method.

BACKGROUND ART

An optical circuit including a Mach-Zehnder interferometer (MZI) or a composite of MZIs is widely used as an optical filter or an optical modulator having periodicity. In particular, a nested MZI is widely used for an optical IQ modulator for generating an optical quadrature amplitude modulation (QAM) signal.

FIG. 10 is a diagram illustrating a configuration of an MZI 91. The MZI 91 is an MZI having the most basic configuration. An optical input port 1 receives input light. An optical splitter circuit 2 branches the input light input to the optical input port 1 into two. In many cases, this branching ratio is one to one. However, the ratio is not necessarily limited to this ratio. One of two light beams branched by the optical splitter circuit 2 is propagated through a first optical waveguide 3, and the other one of the light beams is propagated through a second optical waveguide 4. An optical multiplexing circuit 6 multiplexes the light propagated through the first optical waveguide 3 and the light propagated through the second optical waveguide 4. The optical multiplexing circuit 6 outputs the multiplexed light to an output port 7. The optical path length of the second optical waveguide 4 is finely adjusted by a bias voltage Vb applied by a bias port 5. For this fine adjustment, a Pockels effect or thermal expansion of an optical waveguide by a heater can be used.

A difference between the optical path length of the first optical waveguide 3 and the optical path length of the second optical waveguide 4 is defined as an optical path difference ΔL. The magnitude of the light intensity of the output light output from the output port 7 varies depending on a wavelength λ of the input light and the optical path difference ΔL. However, the wavelength λ is affected by the refractive index of the optical waveguide. Furthermore, the optical path length is affected by a circuit configurations of the optical splitter circuit 2 and the optical multiplexing circuit 6.

In the present application, for the sake of simplicity, the wavelength λ is not an optical wavelength in vacuum, but a wavelength at the time of propagation inside the optical waveguide. Furthermore, in the present application, the optical path length is a value obtained by adding optical phase shift inside the optical splitter circuit 2 or inside the optical multiplexing circuit 6. As an example, in a case where the optical phase is delayed by π/2 (the unit is radian, and the same applies hereinafter) inside the optical multiplexing circuit 6 in the process of propagating the light from the second optical waveguide 4 to the output port 7, this phase delay is regarded as an increase in the optical path length corresponding to λ/4. The reason is that the wavelength λ corresponds to an optical phase 2π.

FIG. 11 is a diagram illustrating a relationship between the light output intensity P(λ) which is the intensity of the output light of the MZI 91 illustrated in FIG. 10, and the optical path difference ΔL. FIG. 11(a) illustrates a relationship before a bias drift occurs, and FIG. 11(b) illustrates a relationship after the bias drift occurs. The bias drift will be described later.

As is well known, the light output intensity P(λ) from the MZI indicates a sign-wave response to the optical path difference ΔL. A maximum output state, a minimum output state, and an intermediate state between the maximum output state and the minimum output state are often referred to as a Peak point, a Null point, and a Quad point, respectively. Therefore, the notation is also used in the present application. When the optical path difference ΔL is an even multiple of λ/2 (including zero times), the state becomes a Peak point, and when the optical path difference ΔL is an odd multiple of λ/2, the state becomes a Null point. It should be noted that the Null point, the Quad point, and the Peak point generally depend on the wavelength, but only the peak point at ΔL=0 does not exceptionally depend on the wavelength.

It is considered that the MZI 91 is used as an optical filter to suppress light of a wavelength λ. In this case, any one of the Null points of the wavelength λ is required to be selected. For example, the optical path difference ΔL is set to 0.5λ by adjusting the bias voltage Vb applied by the bias port 5. In FIG. 11(a), this state is indicated by an arrow A9.

However, even when the bias voltage Vb is always kept constant, the light output intensity may change depending on a temperature change outside the MZI 91 or applied stress with the lapse of time. For example, although a bias was set to the Null point as illustrated in FIG. 11(a) and the optical path difference ΔL was 0.5λ, the optical path difference ΔL may become a value different from 0.5λ with the lapse of time as illustrated in FIG. 11(b). This is referred to as a bias drift in the MZI.

In the case of a single MZI, monitoring the presence of bias drift is relatively easy. In the case of the drift from the Null point, the light output intensity increases, and in the case of the drift from the Peak point, the light output intensity decreases. Therefore, the bias drift can be detected by monitoring the light output intensity.

However, if a bias drift is detected, it is not clear whether bias voltage Vb should be increased or decreased to compensate for this bias drift. Furthermore, the light output intensity of a light source is not completely constant and slightly fluctuates. Therefore, there is also a problem that it is necessary to distinguish whether the fluctuation of the light output intensity is caused by the bias drift or instability of the light source.

In order to solve these problems, a technology for changing the bias voltage Vb minutely and performing synchronous detection has already been proposed. In this technology, dithering is performed in which a pilot tone having a small amplitude of a frequency f is superimposed on the bias voltage Vb, and a minute change in the light output intensity P(λ) is synchronously detected at the frequency f. It is possible to determine whether to increase or decrease the bias voltage Vb on the basis of the sign of the synchronous detection result. In addition, circuit noise other than the frequency f is suppressed. Therefore, there is an advantage that a bias condition can be monitored with high accuracy.

The above-described method relates to an optical filter constructed with a single MZI. On the other hand, it is also widely practiced to use a single MZI as an optical modulator by adding a modulation signal to modulate the optical path difference ΔL and modulating the output light. In this case, if the output light is biased to be a Quad point at the moment when the modulation signal is zero, then a non-return to zero (NRZ) signal is obtained. Alternatively, if the output light is biased to be a Null point at the moment when the modulation signal is zero, then a carrier-suppressed return-to-zero (CS-RZ) signal is obtained. Even in a case where the single MZI is used as an optical modulator, a technology for detecting and compensating a bias drift by using synchronous detection has already been proposed.

Next, a case where a QAM signal is generated by an optical IQ modulator configured by a nested MZI will be described. FIG. 12 is a diagram illustrating a configuration of an optical IQ modulator 92. The optical IQ modulator 92 is an optical IQ modulator having a typical configuration. The optical IQ modulator 92 has a configuration in which an in-phase MZI 50 is installed in the first optical waveguide 3 of the MZI 91 illustrated in FIG. 10 and a quadrature MZI 51 is installed in the second optical waveguide 4.

Inside the in-phase MZI 50, an I-side optical splitter circuit 20 branches light transmitted through the first optical waveguide 3 into two and outputs the light beams to two optical paths, respectively, and an I-side optical multiplexing circuit 21 multiplexes the two branched light beams. The optical path difference between two optical paths inside the in-phase MZI 50 is modulated in a push-pull manner by a modulation signal I applied via an I-side modulation electrode 22. Here, the in-phase MZI 50 is biased by a bias voltage Vb_I applied via an I-side bias port 23 so as to be at a Null point at the moment when the modulation signal I is zero. As a result, the optical electric field E_I of the modulated light output from the in-phase MZI 50 randomly has two types of optical phases different by π.

Inside the quadrature MZI 51, a Q-side optical splitter circuit 24 branches light transmitted through the second optical waveguide 4 into two and outputs the light beams to two optical paths, respectively, and a Q-side optical multiplexing circuit 25 multiplexes the two branched light beams. The optical path difference between two optical paths inside the quadrature MZI 51 is modulated in a push-pull manner by a modulation signal Q applied via a Q-side modulation electrode 26. Here, the quadrature MZI 51 is biased by a bias voltage Vb_Q applied via a Q-side bias port 27 so as to be at a Null point at the moment when the modulation signal Q is zero. As a result, the optical electric field E_Q of the modulated light output from the quadrature MZI 51 randomly has two types of optical phases different by π.

The optical multiplexing circuit 6 multiplexes the modulated light output from the in-phase MZI 50 and the modulated light output from the quadrature MZI 51. The optical path difference between two modulated light beams is adjusted by the bias voltage Vb applied via the bias port 5. The bias voltage is set such that the optical phase of the optical electric field E_I and the optical phase of the optical electric field E_Q have a difference of $\pm\pi/4 + \pi \times m_{ph}$. Here, $m_{ph}$ is any integer. In other words, the largest MZI including the first optical waveguide 3 and the second optical waveguide 4, which corresponds to a parent MZI in the nested MZI, is biased to the Quad point by the bias voltage Vb. As a result, the modulated light output from the optical multiplexing circuit 6 becomes a QAM signal. The output port 7 outputs the QAM signal.

In many optical IQ modulators, the power of modulated light is monitored by an optical power monitor in order to monitor a condition of each bias voltage. In FIG. 12, an optical tap circuit 10 taps the light output to the output port 7 and inputs the tapped light to an optical power monitor 11. Furthermore, one of two outputs from the coupler may be connected to the optical power monitor 11 by replacing the optical multiplexing circuit 6 with a two-input two-output coupler.

FIG. 13 is a diagram illustrating, as a constellation, an optical electric field of an optical QAM signal output from the optical multiplexing circuit 6 of the optical IQ modulator 92 illustrated in FIG. 12. FIG. 13(a) illustrates an optical electric field before a bias drift occurs, and FIG. 13(b) and FIG. 13(c) illustrate an optical electric field after the bias drift occurs.

When the bias voltages Vb_I, Vb_Q, and Vb of the optical IQ modulator 92 are all set optimally and the modulation signal I and modulation signal Q of a drive signal have constant amplitudes, the generated modulation signal becomes a 4-QAM, that is, a quadrature phase shift keying (QPSK) signal. FIG. 13(a) illustrates an optical electric field of the QAM signal in this case.

FIG. 13(b) and FIG. 13(c) illustrate the constellations in a case where the bias voltage Vb_I and the bias voltage Vb_Q are appropriate, but the bias voltage Vb deviates from the optimum value. Since the constellation is distorted, the signal quality is greatly degraded. However, each symbol of the constellation maintains a symmetric position with respect to the origin. Therefore, the light intensity of the modulated light illustrated in each of FIG. 13(b) and FIG. 13(c) is the same as the light intensity of the modulated light illustrated in FIG. 13(a). This property does not change even if the order of the QAM is larger than 4, for example, 16 QAM. Therefore, in a case where the QAM signal is generated by the optical IQ modulator, it is much more difficult to determine whether or not the bias voltage Vb is optimal than to determine whether or not the bias voltage Vb_I and the bias voltage Vb_Q are optimal.

However, technical solutions for this problem have already been proposed. One of the solutions is asymmetric bias dithering (for example, refer to Non Patent Literature 1). In the asymmetric bias dithering, small dithering of amplitude with an orthogonal phase is applied to each of the bias voltage Vb_I and the bias voltage Vb_Q. As a result, it is possible to monitor all bias conditions of the bias voltage Vb_I, bias voltage Vb_Q, and bias voltage Vb.

CITATION LIST

Non Patent Literature

Non Patent Literature 1: Hiroto Kawakami, Takayuki Kobayashi, Mitsuteru Yoshida, Tomoyoshi Kataoka and Yutaka Miyamoto, "Auto bias control and bias hold circuit for IQ-modulator in flexible optical QAM transmitter with Nyquist filtering", Optics Express, Vol. 22, No. 23, pp. 28163-28168, November 2014.

SUMMARY OF INVENTION

Technical Problem

In an MZI control technology described so far, there is a problem that a single or a plurality of bias voltages needs to be intentionally slightly varied from an optimum point. In particular, in a case where dithering is performed by adding a pilot tone of the frequency f to the bias voltage, noise of the frequency f or noise of an integral multiple thereof is superimposed on the output light of the MZI although the amplitude is small.

In a case where the MZI is used as an optical filter, this noise gives a bad influence as a slight variation in intensity of the output light or a slight variation in wavelength transmission characteristics. Furthermore, in a case where the MZI is used as a modulator, this noise causes slight signal quality degradation. In a high-speed and large-capacity transmission system, for example, even slight signal quality degradation is difficult to tolerate, and thus the amplitude of dithering is strongly limited. However, limiting the amplitude of dithering degrades the sensitivity for the monitoring of the bias conditions. In some cases, there is a problem that distortion of the constellation and severe degradation of the signal quality are caused.

In view of the above-described circumstances, an object of the present invention is to provide a control circuit and an optical circuit control method capable of adjusting a bias of an optical circuit including a single or a plurality of MZIs such that the quality of output from the optical circuit is improved without adding a pilot tone to a bias voltage.

Solution to Problem

According to an aspect of the present invention, there is provided a control circuit that controls at least one optical path difference among optical path differences of two optical paths of a single Mach-Zehnder interferometer or each of a plurality of the Mach-Zehnder interferometers included in an optical circuit, the control circuit including: a reference light generation unit (hereinafter also referred to as "reference light generator") configured to generate reference light respectively having N types of wavelengths $\lambda_1$ to $\lambda_N$ different from a wavelength $\lambda$ of input light input to the optical circuit in parallel or in a time division manner when N is a natural number; a reference light input unit (hereinafter also referred to as "reference light input circuitry") configured to input the reference light to the optical circuit; an optical power monitor unit (hereinafter also referred to as "optical power monitor") configured to monitor a light intensity of propagated input light which is the input light that has been propagated through the single Mach-Zehnder interferometer or a plurality of the Mach-Zehnder interferometers included in the optical circuit, and a light intensity of propagated reference light which is the reference light that has been propagated through the single Mach-Zehnder interferometer or a plurality of the Mach-Zehnder interferometers through which the propagated input light has been propagated, or a light intensity of light obtained by multiplexing the propagated input light and the propagated reference light; and a controller configured to perform control to correct the optical path difference on the basis of a light intensity $P(\lambda)$ of the propagated input light having the wavelength $\lambda$ and light intensities $P(\lambda_1)$ to $P(\lambda_N)$ of the propagated reference light respectively having the N types of wavelengths $\lambda_1$ to $\lambda_N$, which are obtained using a monitoring result by the optical power monitor unit.

According to another aspect of the present invention, there is provided a control circuit that controls at least one optical path difference among optical path differences of two optical paths of a single Mach-Zehnder interferometer or each of a plurality of the Mach-Zehnder interferometers included in an optical circuit, the control circuit including: a reference light generation unit configured to generate reference light respectively having N types of wavelengths $\lambda_1$ to $\lambda_N$ different from a wavelength $\lambda$ of input light input to the optical circuit in parallel or in a time division manner when N is a natural number; a reference light input unit configured to input the reference light to the optical circuit; an optical power monitor unit configured to monitor a light intensity of propagated input light which is the input light that has been propagated through the single Mach-Zehnder interferometer or a plurality of the Mach-Zehnder interferometers included in the optical circuit, and a light intensity of propagated reference light which is the reference light that has been propagated through the single Mach-Zehnder interferometer or a plurality of the Mach-Zehnder interferometers through which the propagated input light has been propagated, or a light intensity of light obtained by multiplexing the propagated input light and the propagated reference light; and a controller configured to perform control to correct the optical path difference on the basis of light intensities $P(\lambda_1)$ to $P(\lambda_N)$ of the propagated reference light respectively having the N types of wavelengths $\lambda_1$ to $\lambda_N$, which are obtained using a monitoring result by the optical power monitor unit.

According to still another aspect of the present invention, there is provided an optical circuit control method for controlling at least one optical path difference among optical path differences of two optical paths of a single Mach-Zehnder interferometer or each of a plurality of the Mach-Zehnder interferometers included in an optical circuit, the method including: a reference light generation step of generating reference light respectively having N types of wavelengths $\lambda_1$ to $\lambda_N$ different from a wavelength $\lambda$ of input light input to the optical circuit in parallel or in a time division manner when N is a natural number; a reference light input step of inputting the reference light to the optical circuit; a monitor step of monitoring a light intensity of propagated input light which is the input light that has been propagated through the single Mach-Zehnder interferometer or a plurality of the Mach-Zehnder interferometers included in the optical circuit, and a light intensity of propagated reference light which is the reference light that has been propagated through the single Mach-Zehnder interferometer or a plurality of the Mach-Zehnder interferometers through which the propagated input light has been propagated, or a light intensity of light obtained by multiplexing the propagated input light and the propagated reference light; and a control step of performing control to correct the optical path difference on the basis of a light intensity $P(\lambda)$ of the propagated input light having the wavelength $\lambda$ and light intensities $P(\lambda_1)$ to $P(\lambda_N)$ of the propagated reference light respectively having the N types of wavelengths $\lambda_1$ to $\lambda_N$, which are obtained using a monitoring result in the monitor step or on the basis of the light intensities $P(\lambda_1)$ to $P(\lambda_N)$ without using the light intensity $P(\lambda)$.

Advantageous Effects of Invention

According to the aspects of the present invention, a bias of the optical circuit including the single MZI or a plurality of the MZIs can be adjusted such that the quality of output from the optical circuit is improved without adding a pilot tone to a bias voltage.

BRIEF DESCRIPTION OF DRAWINGS

FIG. 12 is a diagram illustrating a configuration of an optical IQ modulator.

DESCRIPTION OF EMBODIMENTS

Hereinafter, embodiments of the present invention will be described in detail with reference to the drawings. Embodiments to be described herein relate to a control circuit that precisely controls an optical path length of a Mach-Zehnder interferometer (MZI).

First Embodiment

Figure 1:
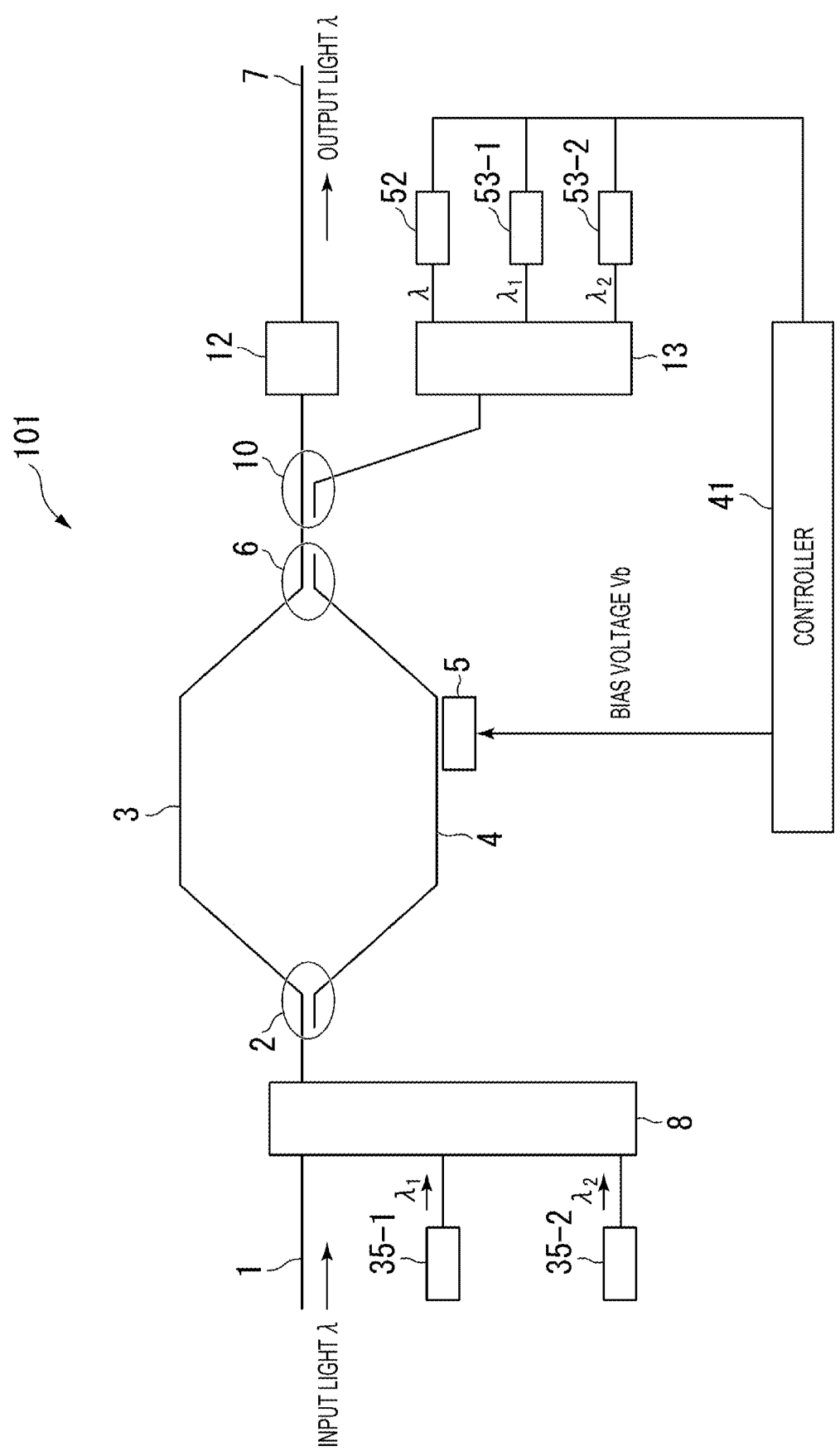
FIG. 1 is a diagram illustrating a configuration of an optical circuit according to a first embodiment of the present invention.
Figure 10:
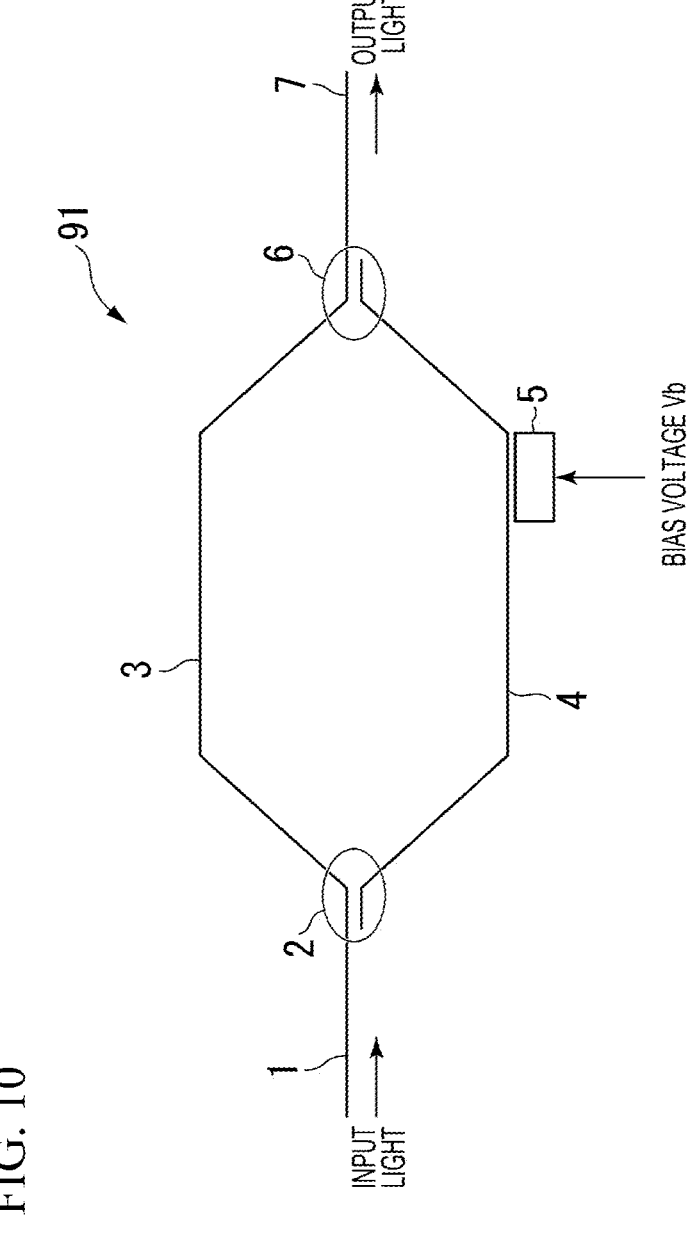
FIG. 10 is a diagram illustrating a configuration of an MZI.

FIG. 1 is a diagram illustrating a configuration of a light output circuit 101 according to a first embodiment. MZI control according to the first embodiment and operation thereof will be described with reference to FIG. 1. In the light output circuit 101 illustrated in FIG. 1, the same portions as those of an MZI 91 illustrated in FIG. 10 are denoted by the same reference numerals. In the light output circuit 101, an optical circuit to be subjected to the MZI control is an optical filter including a single MZI. This optical filter has many parts in common with the MZI 91 illustrated in FIG. 10.

One of differences between the configuration of the optical filter included in the light output circuit 101 illustrated in FIG. 1 and the configuration of the MZI 91 illustrated in FIG. 10 is that a wavelength multiplexing coupler 8 is provided on the optical input port 1. The wavelength multiplexing coupler 8 multiplexes input light having the wavelength $\lambda$ input to the optical input port 1 and reference light output from each of N (N is a natural number) reference light sources 35 and inputs the multiplexed light to the MZI. The n-th (n is an integer of one or more and N or less) reference light source 35 is described as an n-th reference light source 35-$n$, and the reference light having the wavelength $\lambda_n$ output from the n-th reference light source 35-$n$ is described as n-th reference light. The wavelengths $\lambda_1$ to $\lambda_N$ are different wavelengths. Hereinafter, an example of N=2 will be described. That is, the wavelength multiplexing coupler 8 multiplexes the input light having the wavelength $\lambda$ input to the optical input port 1, the first reference light having the wavelength $\lambda_1$ output from the first reference light source 35-1, and the second reference light having the wavelength $\lambda_2$ output from the second reference light source 35-2, and inputs the multiplexed light to the MZI.

Here, it is also possible to use one type of reference light. However, in order to increase the accuracy of control, it is desirable that there are two or more types. Furthermore, it is desirable that the wavelength $\lambda_1$ or the wavelength $\lambda_2$ of the reference light is greatly different from the wavelength $\lambda$. In addition, it is more desirable that at least one of a plurality of the reference light beams has a wavelength longer than the wavelength $\lambda$, and the other reference light beams have a wavelength shorter than the wavelength $\lambda$. However, the difference between the wavelength $\lambda_1$ and the wavelength $\lambda$ and the difference between the wavelength $\lambda_2$ and the wavelength $\lambda$ are desirably different from a free spectrum range. That is, it is desirable to avoid wavelength selection in which the wavelength $\lambda$ and the wavelength $\lambda_1$ become null in parallel (or peak in parallel) or the wavelength $\lambda$ and the wavelength $\lambda_2$ become null in parallel (or peak in parallel). In the present embodiment, the description will be made with $\lambda_2 > \lambda > \lambda_1$ consistently.

The optical splitter circuit 2 branches the light multiplexed by the wavelength multiplexing coupler 8 into two. One of two branched light beams is propagated through the first optical waveguide 3, and the other one of the light beams is propagated through the second optical waveguide 4. The optical path length of the second optical waveguide 4 is finely adjusted by a bias voltage Vb applied by a bias port 5. An optical multiplexing circuit 6 multiplexes the light propagated through the first optical waveguide 3 and the light propagated through the second optical waveguide 4, and outputs the multiplexed light to the output port 7.

Another difference between the configuration of the optical filter included in the light output circuit 101 illustrated in FIG. 1 and the configuration of the MZI 91 of the related art illustrated in FIG. 10 is that an optical band pass filter 12 is provided on the output port 7. The optical band pass filter 12 receives the light multiplexed by the optical multiplexing circuit 6, blocks the first reference light having the wavelength $\lambda_1$ to the N-th reference light having the wavelength $\lambda_N$ from the input light, and outputs only the output light having the wavelength $\lambda$. In the case of N=2, the optical band pass filter 12 blocks the first reference light having the wavelength $\lambda_1$ and the second reference light having the wavelength $\lambda_2$ from the input light, and outputs only the output light having the wavelength $\lambda$. When the wavelength $\lambda_1$ of the first reference light and the wavelength $\lambda_2$ of the second reference light are greatly different from the wavelength $\lambda$, the transmission band of the optical band pass filter 12 can be sufficiently wide. That is, the accuracy required for setting the center wavelength of the transmission band is relaxed.

Another difference between the configuration of the optical filter included in the light output circuit 101 illustrated in FIG. 1 and the configuration of the conventional MZI 91 illustrated in FIG. 10 of the related art is that an optical tap circuit 10, a wavelength separation coupler 13, an optical power monitor 52, N reference light power monitors 53, and a controller 41 are provided. The n-th reference light power monitor 53 is referred to as an n-th reference light power monitor 53-$n$.

The optical tap circuit 10 is provided between the optical multiplexing circuit 6 and the optical band pass filter 12. The optical tap circuit 10 taps the output light of the optical multiplexing circuit 6 before the optical band pass filter 12 blocks the reference light.

The wavelength separation coupler 13 separates the light tapped by the optical tap circuit 10 into the input light having the wavelength $\lambda$ and the first reference light having the wavelength $\lambda_1$ to the N-th reference light having the wavelength $\lambda_N$. The wavelength separation coupler 13 is connected to the optical power monitor 52 and the first reference light power monitor 53-1 to the N-th reference light power monitor 53-N. The optical power monitor 52 monitors the input light having the wavelength $\lambda$ separated by the wavelength separation coupler 13. The n-th reference light power monitor 53-$n$ monitors the n-th reference light having the wavelength $\lambda_n$ separated by the wavelength separation coupler 13.

The controller 41 compares the light intensity of the wavelength $\lambda$, the light intensity of the first reference light having the wavelength $\lambda_1$, . . . , and the light intensity of the N-th reference light having the wavelength $\lambda_N$ to determine whether or not the optical path difference between two optical paths included in the MZI of the light output circuit 101 is the optimum value. In a case where it is determined that the value is not the optimum value, the controller 40 corrects the optical path difference by controlling the bias voltage Vb.

In the case of N=2, the wavelength separation coupler 13 separates the light tapped by the optical tap circuit 10 into the input light having the wavelength $\lambda$ and the first reference light having the wavelength $\lambda_1$, and the second reference light having the wavelength $\lambda_2$. The optical power monitor 52 monitors the light intensity of the input light having the wavelength $\lambda$, the first reference light power monitor 53-1 monitors the light intensity of the first reference light having the wavelength $\lambda_1$, and the second reference light power monitor 53-2 monitors the light intensity of the second reference light having the wavelength $\lambda_2$. The controller 41 controls the bias voltage Vb on the basis of the monitoring results of the optical power monitor 52, the first reference light power monitor 53-1, and the second reference light power monitor 53-2.

As described above, the control circuit that performs the MZI control in the light output circuit 101 includes the first reference light source 35-1 to the N-th reference light source 35-N, the wavelength multiplexing coupler 8, the optical tap circuit 10, the wavelength separation coupler 13, the optical power monitor 52, the first reference light power monitor 53-1 to the N-th reference light power monitor 53-N, and the controller 41.

Figure 2:
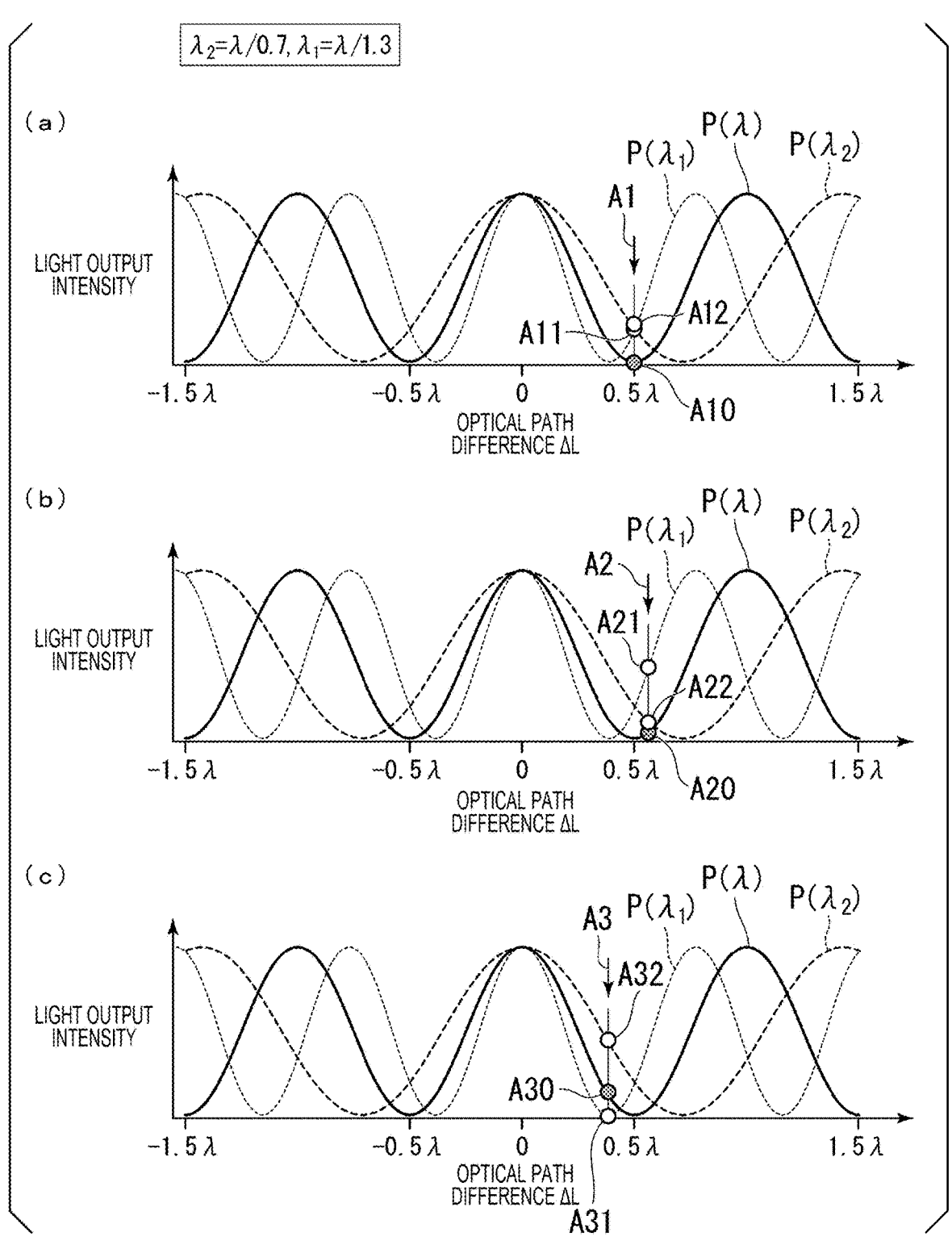
FIG. 2 is a diagram illustrating a relationship between an optical path difference of an MZI and a light output intensity of light having each wavelength in an optical circuit according to the first embodiment.

Next, how the bias condition of the MZI used as the optical filter of the light output circuit 101 illustrated in FIG. 1 is monitored will be described. FIG. 2 is a diagram illustrating a relationship between the optical path difference $\Delta L$ of the MZI and the light output intensity of light of each wavelength output to the output port 7 in the light output circuit 101. The optical path difference $\Delta L$ is a difference between the optical path length of the first optical waveguide 3 and the optical path length of the second optical waveguide 4. The light output intensity $P(\lambda)$ of the wavelength $\lambda$ is monitored by the optical power monitor 52, the light output intensity $P(\lambda_1)$ of the wavelength $\lambda_1$ is monitored by the first reference light power monitor 53-1, and the light output intensity $P(\lambda_2)$ of the wavelength $\lambda_2$ is monitored by the second reference light power monitor 53-2.

Figure 11:
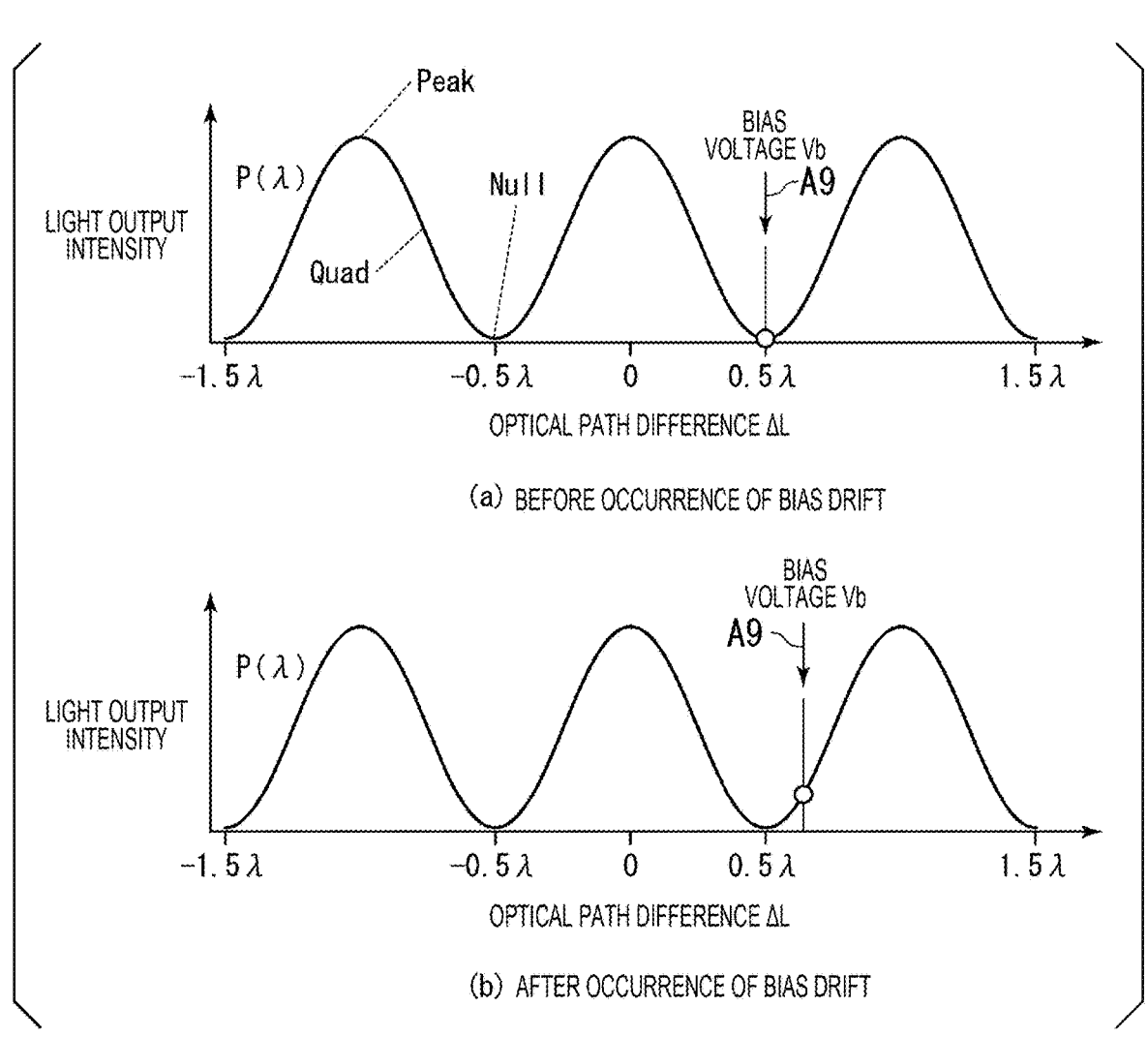
FIG. 11 is a diagram illustrating a relationship between an output light intensity of an MZI and an optical path difference.
Figure 13:
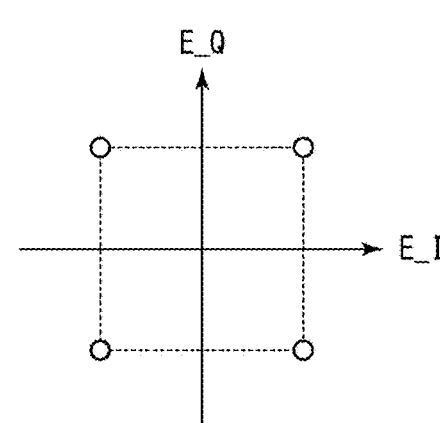
FIG. 13 is a diagram illustrating an optical electric field of an optical QAM signal output from an optical IQ modulator.
Figure 13:
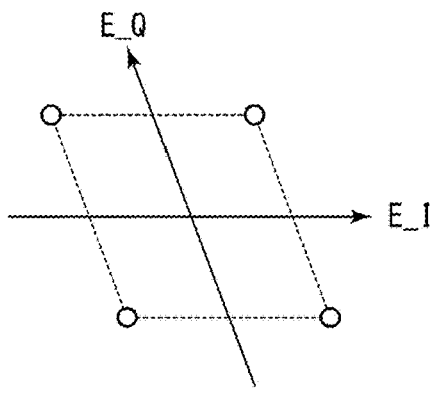
Figure 13:
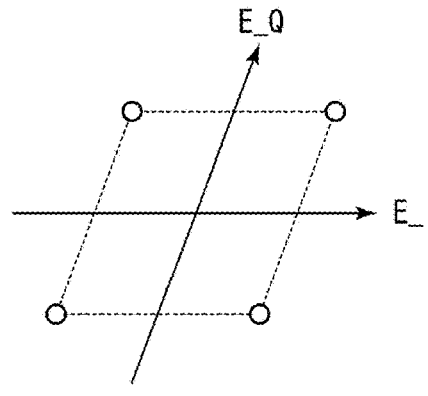

First, similarly to FIG. 11, it is considered to bias the MZI to the Null point at the wavelength $\lambda$ by using the bias voltage Vb. As indicated by an arrow A1 in FIG. 2(*a*), 0.5$\lambda$ is selected as the optical path difference $\Delta L$. When the bias voltage Vb is in an appropriate state, the light output intensity $P(\lambda)$ of the wavelength $\lambda$ is minimized as indicated by a point A10 in FIG. 2(*a*).

Here, a behavior between the light output intensity $P(\lambda_1)$ of the first reference light having the wavelength $\lambda_1$ and the light output intensity $P(\lambda_2)$ of the second reference light having the wavelength $\lambda_2$ will be considered. In FIGS. 2, $\lambda_1=\lambda/1.3$, and $\lambda_2=\lambda/0.7$. As indicated by a point A11 and a point A12 in FIG. 2(*a*), in a case where the optical path difference $\Delta L$ is 0.5$\lambda$, the light output intensity $P(\lambda_1)$ and the light output intensity $P(\lambda_2)$ are not minimum and are higher than the light output intensity $P(\lambda)$. This state is set as a reference state.

FIG. 2(*b*) illustrates the light output intensity $P(\lambda)$, the light output intensity $P(\lambda_1)$, and the light output intensity $P(\lambda_2)$ in a case where the bias drift occurs and the optical path difference $\Delta L$ increases more than 0.5$\lambda$ as indicated by an arrow A2. As compared with the reference state illustrated in FIG. 2(*a*), it can be seen that the light output intensity $P(\lambda)$ of the wavelength $\lambda$ slightly increases as illustrated at a point A20, the light output intensity $P(\lambda_1)$ of the wavelength $\lambda_1$ rapidly increases as illustrated at a point A21, and the light output intensity $P(\lambda_2)$ of the wavelength $\lambda_2$ decreases as illustrated at a point A22.

FIG. 2(*c*) illustrates the light output intensity $P(\lambda)$, the light output intensity $P(\lambda_1)$, and the light output intensity $P(\lambda_2)$ in a case where the bias drift occurs and the optical path difference $\Delta L$ decreases more than 0.5$\lambda$ as indicated by an arrow A3. As compared with the reference state illustrated in FIG. 2(*a*), the light output intensity $P(\lambda)$ of the wavelength $\lambda$ slightly increases as illustrated at a point A30 as in the case of FIG. 2(*b*). However, unlike the case of FIG. 2(*b*), the light output intensity $P(\lambda_1)$ of the wavelength $\lambda_1$ decreases as indicated by a point A31, and the light output intensity $P(\lambda_2)$ of the wavelength $\lambda_2$ rapidly increases as indicated by a point A32.

From these pieces of information, the controller 41 can determine whether the optical path difference $\Delta L$ drifts in a direction of increasing from a target value 0.5$\lambda$ or drifts in a direction of decreasing from the target value. Then, the controller 41 can feed back the result to the bias voltage Vb. This feedback is implemented by the controller 41 increasing or decreasing the bias voltage Vb according to the determination result.

However, in implementing the feedback, the following problems occur. First, when the optical path difference $\Delta L$ increases (or decreases) more than the optimum value, it is necessary to correctly obtain a correspondence relationship as to whether to increase or decrease the bias voltage Vb. Since this is the correspondence relationship uniquely determined after manufacturing of the MZI, the correspondence relationship can be confirmed by an operation test before starting operation and implemented in the controller 41.

Another problem is that the behavior of three types of light intensities of the light output intensities $P(\lambda)$, $P(\lambda_1)$, and $P(\lambda_2)$, changes depending on which Null point is selected. The Null point occurs at an optical path difference $\Delta L$ satisfying $\Delta L = \pm \lambda/2 \times (2m+1)$ when m is an integer of zero or more. In FIG. 2, a case where m=0 and a sign is positive has been described as an example. However, even when m=0, in a case where the sign is negative, that is, in a case of $\Delta L = -0.5\lambda$, as is clear from FIG. 2, the change in the intensity of a reference light group when the bias drift occurs is opposite to that in a case of $\Delta L = +0.5\lambda$. Furthermore, in a case where an integer of one or more is selected as m, the behavior of the intensity change of each of the light output intensities $P(\lambda)$, $P(\lambda_1)$, and $P(\lambda_2)$ is different from those illustrated by the points A11 to A13, the points A21 to A23, and the points A31 to A33 in FIG. 2.

In order to solve this problem, a training period can be provided immediately after the control of the MZI is started. In the training period, the following work is performed.

First, by using the related art, the controller 41 locks to any Null point satisfying $\Delta L = \pm \lambda/2 \times (2m+1)$ by superimposing the pilot tone (dithering) on the bias voltage Vb and synchronous detection. After the locking ends, the controller 41 stops the pilot tone, intentionally changes the bias voltage Vb, and performs learning of the variation of the three types of light output intensities $P(\lambda_1)$, $P(\lambda)$, and $P(\lambda_2)$. When this learning is completed, the training period ends. It is necessary to end the training period in a short period of time when the bias drift of the MZI can be ignored.

After the training period ends, the controller 41 can monitor and control the bias condition while referring to the training result. That is, the controller 41 determines whether or not the optical path difference AL is the optimum value, and when being not the optimum value, determines whether to increase or decrease the bias voltage Vb, and performs feedback control of the bias voltage Vb.

In the above description, the case of controlling the MZI at the null point has been described. In a case where the MZI is controlled to be at the Quad point, the control is only required to be performed so as to satisfy $\Delta L = \pm \lambda/2 \times (2m+0.5)$ or $\Delta L = \pm \lambda/2 \times (2m+1.5)$. Here, m is an integer of zero or more.

Furthermore, in a case where the MZI is controlled to be at the Peak point, the controller 41 performs control so as to satisfy $\Delta L = \pm m\lambda$. In this case, m is preferably an integer other than zero and equal to or greater than one. The reason is that as illustrated in FIG. 2, near $\Delta L = 0$, the transmission characteristic of the MZI has almost no wavelength dependency, and it is difficult to apply the present embodiment.

Second Embodiment

In the first embodiment, the control circuit for MZI control simultaneously generates the reference light in parallel, and monitors each of the input light and the reference light passing through the MZI by using a plurality of optical power monitors. In the second embodiment, the control circuit of the MZI generates the reference light in a time division (time sharing) manner, and monitors each of the input light and the reference light passing through the MZI by using one optical power monitor. The present embodiment will be described focusing on a difference from the first embodiment.

Figure 3:
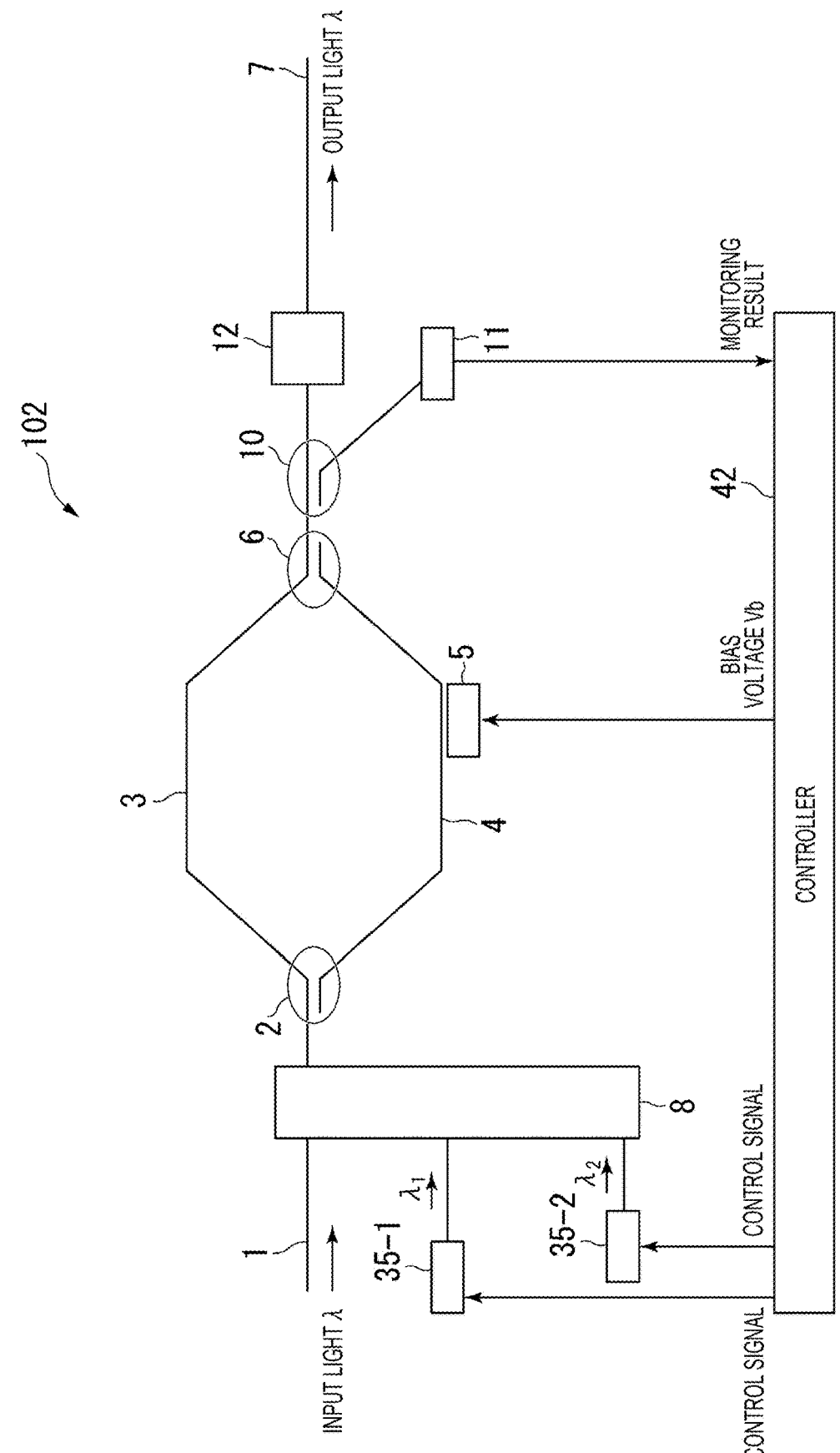
FIG. 3 is a diagram illustrating a configuration of an optical circuit according to a second embodiment.

FIG. 3 is a diagram illustrating a configuration of a light output circuit 102 according to the second embodiment. In the light output circuit 102 illustrated in FIG. 3, the same portions as those of the light output circuit 101 according to the first embodiment illustrated in FIG. 1 are denoted by the same reference numerals, and the description thereof will be omitted. MZI control according to the second embodiment and operation thereof will be described with reference to FIG. 3. Even in the light output circuit 102 illustrated in FIG. 3, an optical circuit to be subjected to the MZI control is an optical filter including a single MZI.

The light output circuit 102 of the second embodiment illustrated in FIG. 3 is different from the light output circuit 101 of the first embodiment illustrated in FIG. 1 in that a controller 42 is provided instead of the controller 41 and only one optical power monitor 11 is provided instead of the (N+1) optical power monitors of the optical power monitor 52 and the first reference light power monitor 53-1 to the N-th reference light power monitor 53-N. The control circuit that performs the MZI control in the light output circuit 102 includes N reference light sources 35, the wavelength multiplexing coupler 8, the optical tap circuit 10, the wavelength separation coupler 13, the optical power monitor 11, and the controller 42. In the present embodiment, a case of N=2 will be described as an example.

The controller 42 controls each of the first reference light source 35-1 and the second reference light source 35-2 to be in a state of light-extinguishing or light emission. In a case where both the first reference light source 35-1 and the second reference light source 35-2 are extinguished, the monitoring result of the optical power monitor 11 indicates the light output intensity $P(\lambda)$ of the wavelength $\lambda$.

On the other hand, in a case where the first reference light source 35-1 emits light and the second reference light source 35-2 is controlled to be extinguished by the controller 42, the monitoring result of the optical power monitor 11 is determined by both the light output intensity $P(\lambda)$ of the wavelength $\lambda$ and the light output intensity $P(\lambda_1)$ of the wavelength $\lambda_1$. This monitoring result is indicated by a light output intensity $P(\lambda, \lambda_1)$.

In a case where the wavelength dependency of the sensitivity of the optical power monitor 11 can be ignored, the light output intensity $P(\lambda_1)$ of the wavelength $\lambda_1$ can be simply obtained as a difference obtained by subtracting the light output intensity $P(\lambda)$ from the light output intensity $P(\lambda, \lambda_1)$. In a case where the wavelength dependency of the optical power monitor 11 cannot be ignored, a difference between the two may be calculated after multiplication by a correction coefficient. These calculations can be easily implemented by performing analog/digital conversion of the monitoring result inside the controller 42 and performing digital calculations.

In a case where the controller 42 controls the first reference light source 35-1 to be extinguished and the second reference light source 35-2 to emit light, the monitoring result of the optical power monitor 11 is determined by both the light output intensity $P(\lambda)$ of the wavelength $\lambda$ and the light output intensity $P(\lambda_2)$ of the wavelength $\lambda_2$. The light output intensity $P(\lambda_2)$ of the wavelength $\lambda_2$ can be obtained by the same procedure as in the case of the first reference light.

The controller 42 can control the bias voltage Vb as in the first embodiment after obtaining information regarding three types of light output intensities of the light output intensity $P(\lambda)$, the light output intensity $P(\lambda_1)$, and the light output intensity $P(\lambda_2)$.

As described above, the controller 42 performs control such that all of the N reference light sources 35 are extinguished or only one of the N reference light sources 35 emits light. In a case where all the N reference light sources 35 are extinguished, the input light having the wavelength $\lambda$ that has passed through the optical filter is output to the output port 7. In a case where the n-th reference light source 35-$n$ emits light and the other reference light source 35 are extinguished, light obtained by multiplexing the input light having the wavelength $\lambda$ and the n-th reference light having the wavelength $\lambda_n$ that have passed through the optical filter is output to the output port 7. The optical power monitor 11 obtains the monitoring result of the light output intensity $P(\lambda)$ of the wavelength $\lambda$ in a case where all of the N reference light sources 35 are extinguished, and obtains the light output intensity $P(\lambda, \lambda_n)$ in a case where only the n-th reference light source 35-$n$ emits light. The controller 42 subtracts the light output intensity $P(\lambda)$ from the light output intensity $P(\lambda, \lambda_n)$ to obtain the light output intensity $P(\lambda_n)$ of the n-th reference light. As in the first embodiment, the controller 42 controls the bias voltage Vb by using the light output intensity $P(\lambda)$, and the light output intensity $P(\lambda_1)$ to the light output intensity $P(\lambda_N)$.

The second embodiment is more complicated than the first embodiment in that calculation is required. However, there is an advantage that only one optical power monitor can be used.

Third Embodiment

In the second embodiment, the control circuit of the MZI generates the reference light beams having a plurality of types of wavelengths from a plurality of the reference light sources. In the present embodiment, the control circuit of the MZI generates the reference light beams having a plurality of types of wavelengths in a time division manner from a single reference light source. Moreover, the control circuit of the MZI of the present embodiment generates reference light having an optical pulse train, and obtains the light intensity of the reference light having passed through the MZI by synchronous detection. The present embodiment will be described by focusing on differences from the above-described embodiments.

Figure 4:
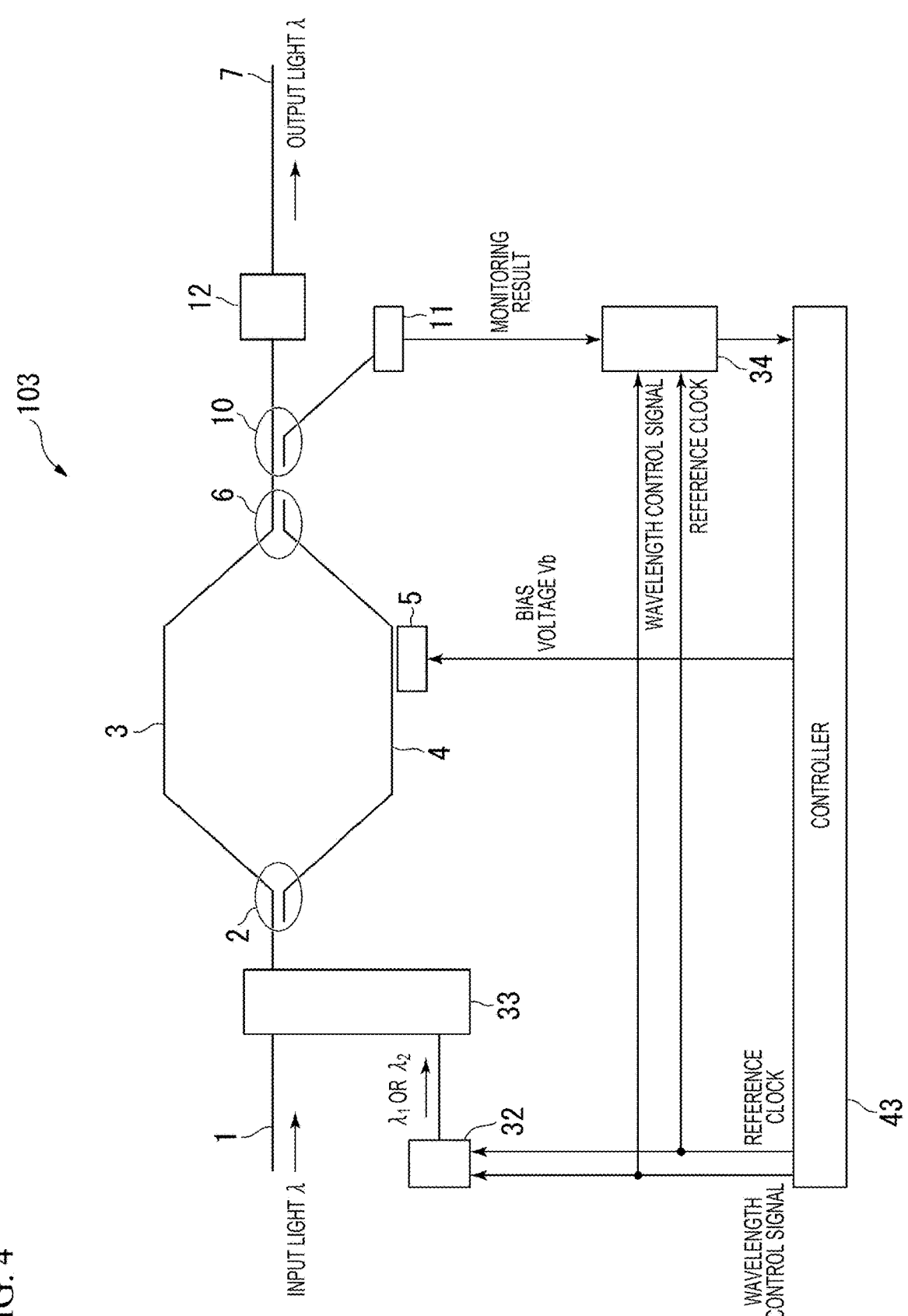
FIG. 4 is a diagram illustrating a configuration of an optical circuit according to a third embodiment.

FIG. 4 is a diagram illustrating a configuration of a light output circuit 103 according to the third embodiment. In the light output circuit 103 illustrated in FIG. 4, the same portions as those of the light output circuit 101 according to the first embodiment in FIG. 1 and the light output circuit 102 according to the second embodiment illustrated in FIG. 3 are denoted by the same reference numerals, and the description thereof will be omitted. MZI control according to the third embodiment and operation thereof will be described with reference to FIG. 4. Even in the light output circuit 103 illustrated in FIG. 4, an optical circuit to be subjected to the MZI control is an optical filter including a single MZI.

The configuration of the light output circuit 103 of the third embodiment illustrated in FIG. 4 is different from the configuration of the light output circuit 102 of the second embodiment illustrated in FIG. 3 in that an optical coupler 33 is provided instead of the wavelength multiplexing coupler 8, a wavelength variable light source 32 is provided instead of the N reference light sources 35, a controller 43 is provided instead of the controller 42, and a synchronous detection/averaging processing circuit 34 is further provided. The control circuit that performs the MZI control in the light output circuit 103 includes the wavelength variable light source 32, the optical coupler 33, the optical tap circuit 10, the optical power monitor 11, the synchronous detection/averaging processing circuit 34, and the controller 42.

The wavelength variable light source 32 generates the first reference light to the N-th reference light. In the present embodiment, a case of N=2 will be described as an example. The optical coupler 33 outputs light obtained by multiplexing the input light having the wavelength $\lambda$ and the first reference light having the wavelength $\lambda_1$ or the second reference light having the wavelength $\lambda_2$ generated by the wavelength variable light source 32. The optical splitter circuit 2 branches the light multiplexed by the optical coupler 33 into two. Furthermore, the synchronous detection/averaging processing circuit 34 performs synchronous detection or averaging processing on the monitoring result by the optical power monitor 11.

The wavelength variable light source 32 is controlled by a wavelength control signal output by controller 43. The wavelength control signal has a three-value. The wavelength variable light source 32 takes a state of generating the optical pulse train having the wavelength $\lambda_1$, generating the optical pulse train having the wavelength $\lambda_2$, or extinguishing light according to the level of the wavelength control signal. The pulse interval and phase of the optical pulse train are determined by a reference clock output by the controller 43.

First, a case where the output of the wavelength variable light source 32 is extinguished according to the wavelength control signal output by the controller 43 will be described. At this time, the monitoring result output by the optical power monitor 11 is the light output intensity $P(\lambda)$.

The controller 43 also outputs the wavelength control signal to the synchronous detection/averaging processing circuit 34. In a case where extinguishing of the wavelength variable light source 32 is instructed by the wavelength control signal, the synchronous detection/averaging processing circuit 34 performs averaging processing of the monitoring result output by the optical power monitor 11. As a result, noise such as a dark current superimposed on the optical power monitor 11 is suppressed.

First, a case where the wavelength variable light source 32 generates the optical pulse train having a wavelength $\lambda_1$ according to the wavelength control signal output by the controller 43 will be described. At this time, the monitoring result output by the optical power monitor 11 periodically repeats the light output intensity $P(\lambda)$ and the light output intensity $P(\lambda, \lambda_1)$.

The controller 43 also outputs the wavelength control signal to the synchronous detection/averaging processing circuit 34. In a case where the wavelength variable light source 32 is instructed to generate the optical pulse train having the wavelength $\lambda_1$, the synchronous detection/averaging processing circuit 34 performs synchronous detection of the monitoring result output by the optical power monitor 11. The controller 43 outputs the reference clock to the synchronous detection/averaging processing circuit 34 as well as the wavelength variable light source 32. The synchronous detection/averaging processing circuit 34 performs synchronous detection with reference to the reference clock. Therefore, the synchronous detection/averaging processing circuit 34 obtains an amount corresponding to a difference between the light output intensity $P(\lambda, \lambda_1)$ and the light output intensity $P(\lambda)$, that is, the light output intensity $P(\lambda_1)$ as a synchronous detection result. In a case where the wavelength dependency of the optical power monitor 11 cannot be ignored or in a case where a loss due to filtering at the time of synchronous detection cannot be ignored, a correction coefficient may be added to the synchronous detection result in the controller 43.

In a case where the wavelength variable light source 32 generates the optical pulse train having the wavelength $\lambda_2$ according to the wavelength control signal output by the controller 43, the monitoring result output by the optical power monitor 11 periodically repeats the light output intensity $P(\lambda)$ and the light output intensity $P(\lambda, \lambda_2)$. The controller 43 obtains the light output intensity $P(\lambda_2)$ by performing the synchronous detection processing similar to the case of the first reference light.

The controller 43 controls the bias voltage Vb as in the first embodiment after obtaining information regarding three types of light intensities of the light output intensity $P(\lambda)$, the light output intensity $P(\lambda_1)$, and the light output intensity $P(\lambda_2)$.

As described above, the controller 43 instructs the wavelength variable light source 32 to generate any of the optical pulse train having the wavelength $\lambda_1$ to the optical pulse train having the wavelength $\lambda_N$ or extinguish light according to the wavelength control signal. In a case where the output of the wavelength variable light source 32 is extinguished, the synchronous detection/averaging processing circuit 34 performs averaging processing of the monitoring result output by the optical power monitor 11 and obtains the light output intensity $P(\lambda)$. In a case where the wavelength variable light source 32 generates the optical pulse train having the wavelength $\lambda_n$ on the basis of the reference clock, the synchronous detection/averaging processing circuit 34 performs synchronous detection of the monitoring result output by the optical power monitor 11 with reference to the reference clock. The synchronous detection/averaging processing circuit 34 obtains the light output intensity $P(\lambda_n)$ which is a difference between the light output intensity $P(\lambda, \lambda_n)$ and the light output intensity $P(\lambda)$ by the synchronous detection. As in the first embodiment, the controller 43 controls the bias voltage Vb by using the light output intensity $P(\lambda)$, and the light output intensity $P(\lambda_1)$ to the light output intensity $P(\lambda_N)$.

In this embodiment, the synchronous detection is used, but no dithering is applied to the input light having the wavelength $\lambda$ and the bias voltage Vb. Therefore, no noise is superimposed on the transmitted light. Furthermore, there is an advantage that it is possible to suppress a circuit noise of the optical power monitor and a noise derived from a power fluctuation of the light source.

Variations of Third Embodiment

In the third embodiment, the light output intensity P and the light output intensities $P(\lambda_1)$ and $P(\lambda_2)$ are measured, and the drift of the bias is monitored using these measured values. However, in order to measure $P(\lambda)$ even with the single optical power monitor 11, it is necessary to secure a time zone in which the reference light is extinguished for a certain long time and perform processing such as averaging processing on the output of the optical power monitor 11 in order to suppress the circuit noise of the optical power monitor 11. The longer the time of the averaging processing, the better the noise is suppressed, but on the other hand, there is a problem that the processing speed becomes slower.

Here, FIG. 2 will be focused again. When the values of the light output intensities $P(\lambda_1)$ and $P(\lambda_2)$ in the vicinity of the optimum bias point, that is, the values of the points A11, A12, A21, A22, A31, and A32 can be sufficiently obtained, the bias drift can be estimated without measuring the values of the light output intensity $P(\lambda)$, that is, the points A10, A20, and A30. The reason is that the light output intensity $P(\lambda_1)$ rapidly increases and the light output intensity $P(\lambda_2)$ decreases in a case where the optical path difference $\Delta L$ increases more than the optimum value, whereas the light output intensity $P(\lambda_1)$ decreases and the light output intensity $P(\lambda_2)$ rapidly increases in a case where the optical path difference $\Delta L$ decreases more than the optimum value, as described above with reference to FIG. 2(b) and FIG. 2(c). Therefore, in the training period provided at the time of activating the light output circuit 103, the controller 43 performs training of changes in the light output intensities $P(\lambda_1)$ and $P(\lambda_2)$ in the vicinity of the optimal bias point, and records the trained change as a database, and thus bias control can be performed without measuring the light output intensity $P(\lambda)$. That is, the controller 43 estimates the bias drift by collating the changes in the light output intensities $P(\lambda_1)$ and $P(\lambda_2)$ recorded in the database with the changes in the measured light output intensities $P(\lambda_1)$ and $P(\lambda_2)$, and corrects the optical path difference by controlling the bias voltage Vb on the basis of the estimated bias drift.

Figure 5:
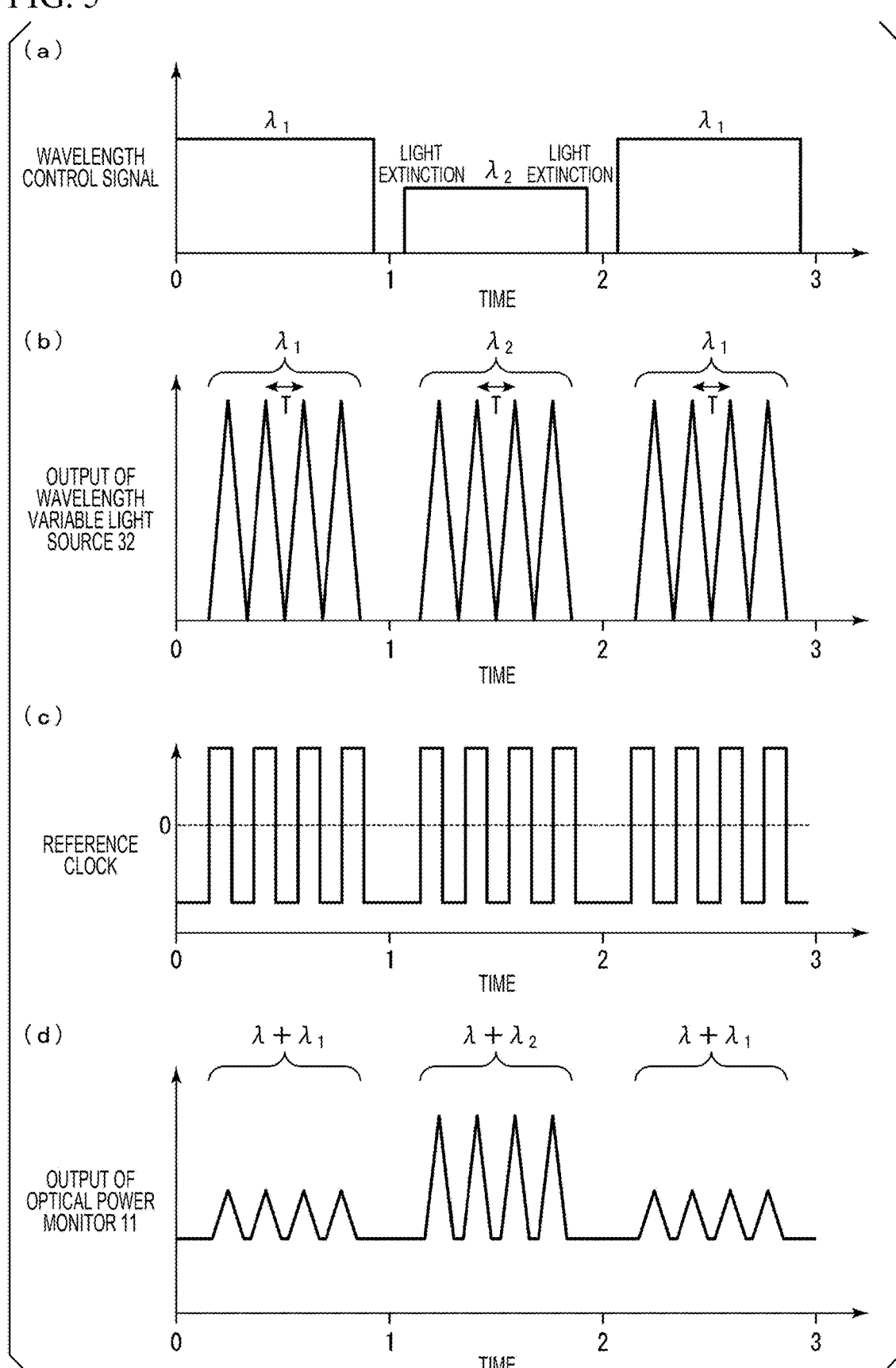
FIG. 5 is a diagram illustrating a simulation result of an optical circuit according to a variation of the third embodiment.

FIG. 5 is a diagram schematically illustrating temporal changes of outputs of the wavelength variable light source 32 and optical power monitor 11 in such an embodiment. FIG. 5(a) illustrates a temporal change of the wavelength control signal, FIG. 5(b) illustrates a temporal change of the output of the wavelength variable light source 32, FIG. 5(c) illustrates a temporal change of the reference clock, and FIG. 5(d) illustrates a temporal change of the output of the optical power monitor 11.

As illustrated in FIG. 5(a), the wavelength control signal has three values of a value for instructing the generation of the optical pulse train having the wavelength $\lambda_1$, a value for instructing the generation of the optical pulse train having the wavelength $\lambda_2$, and a value for instructing light extinction, but the time zone corresponding to the light extinction period is shortened. The light extinction period is a period in which a value for instructing light extinction is output.

As illustrated in FIG. 5(b), the wavelength variable light source 32 takes a state of generating the optical pulse train having the wavelength $\lambda_1$, generating the optical pulse train having the wavelength $\lambda_2$, or taking a short light extinction time according to the value of the control signal. In FIG. 5(b), the wavelength variable light source 32 generates the pulse train having the wavelength $\lambda_1$ in a period of time 0 to 1, the pulse train having the wavelength $\lambda_2$ in a period of time 1 to 2, and the pulse train having the wavelength $\lambda_1$ again in a period of time 2 to 3, but a short light extinction period is provided when the wavelength is changed. The reason is that many wavelength variable light sources require a certain amount of time to change the wavelength. In a case where the time required for changing the wavelength of the wavelength variable light source is sufficiently short, the light extinction period can be omitted, and the wavelength control signal can have two values.

The period of a light pulse is T in a time zone in which the wavelength of the output from the wavelength variable light source 32 is the same. The period T and the phase of the light pulse are determined by the reference clock. Here, as illustrated in FIG. 5(c), it is assumed that the light pulse is generated when the reference clock is at a high level.

The light having the wavelength $\lambda$ is always input to the optical power monitor 11 regardless of the value of the wavelength control signal. Therefore, as illustrated in FIG. 5(d), the minimum level of the output of the optical power monitor 11 is always maintained at the light output intensity $P(\lambda)$. However, it is possible to obtain a value of the light output intensity $(P\lambda_1)$ corresponding to the difference between the light output intensity $P(\lambda, \lambda_1)$ and the light output intensity $P(\lambda)$ and a value of the light output intensity $P(\lambda_2)$ corresponding to the difference between the light output intensity $P(\lambda, _2)$ and the light output intensity $P(\lambda)$ by synchronous detection processing in which the synchronous detection/averaging processing circuit 34 refers to the reference clock by the above-described procedure.

Circuit noise of the optical power monitor 11 is also input to the synchronous detection/averaging processing circuit 34. However, in the process of performing synchronous detection, frequency components other than a frequency 1/T are suppressed. Therefore, the circuit noise of the optical power monitor 11 is suppressed.

Note that in the above description, the reference light having the wavelength $\lambda_1$ and the reference light having the wavelength $\lambda_2$ are generated using only the wavelength variable light source 32, but a plurality of the reference light sources 35 may be used as in the second embodiment illustrated in FIG. 3. That is, the plurality of reference light sources 35 may generate the optical pulse train in a time division manner, and the synchronous detection/averaging processing circuit 34 may perform synchronous detection processing. In this case, the light output circuit 103 includes N reference light sources 35 and a wavelength multiplexing coupler 8 instead of the wavelength variable light source 32 and the optical coupler 33. Furthermore, the controller 41 of the light output circuit 101 of the first embodiment may control the bias voltage Vb on the basis of the light output intensity $P(\lambda_1)$ and the light output intensity $P(\lambda_2)$ which are respectively output from the first reference light power monitor 53-1 and the second reference light power monitor 53-2, similarly to the controller 43 of the present embodiment.

Furthermore, in the above description, the synchronous detection/averaging processing circuit 34 and the controller 43 are different circuits, and the synchronous detection/averaging processing circuit 34 receives a multi-value wavelength control signal transmitted from the controller 43. However, in a case where a synchronous detection circuit is digitally configured, the synchronous detection/averaging processing circuit 34 and the controller 43 can be integrated, and the generation of the optical pulse train, the wavelength change, and the start/interruption of the synchronous detection processing can be performed according to a flowchart programmed in advance. In such a configuration, the wavelength control signal can be omitted.

Fourth Embodiment

In the fourth embodiment, the reference light is transmitted through the optical circuit in a direction opposite to the input light. The present embodiment will be described by focusing on differences from the above-described embodiments. Hereinafter, in the present embodiment, differences from the first embodiment will be mainly described, but the same differences can be applied to other embodiments described above.

Figure 6:
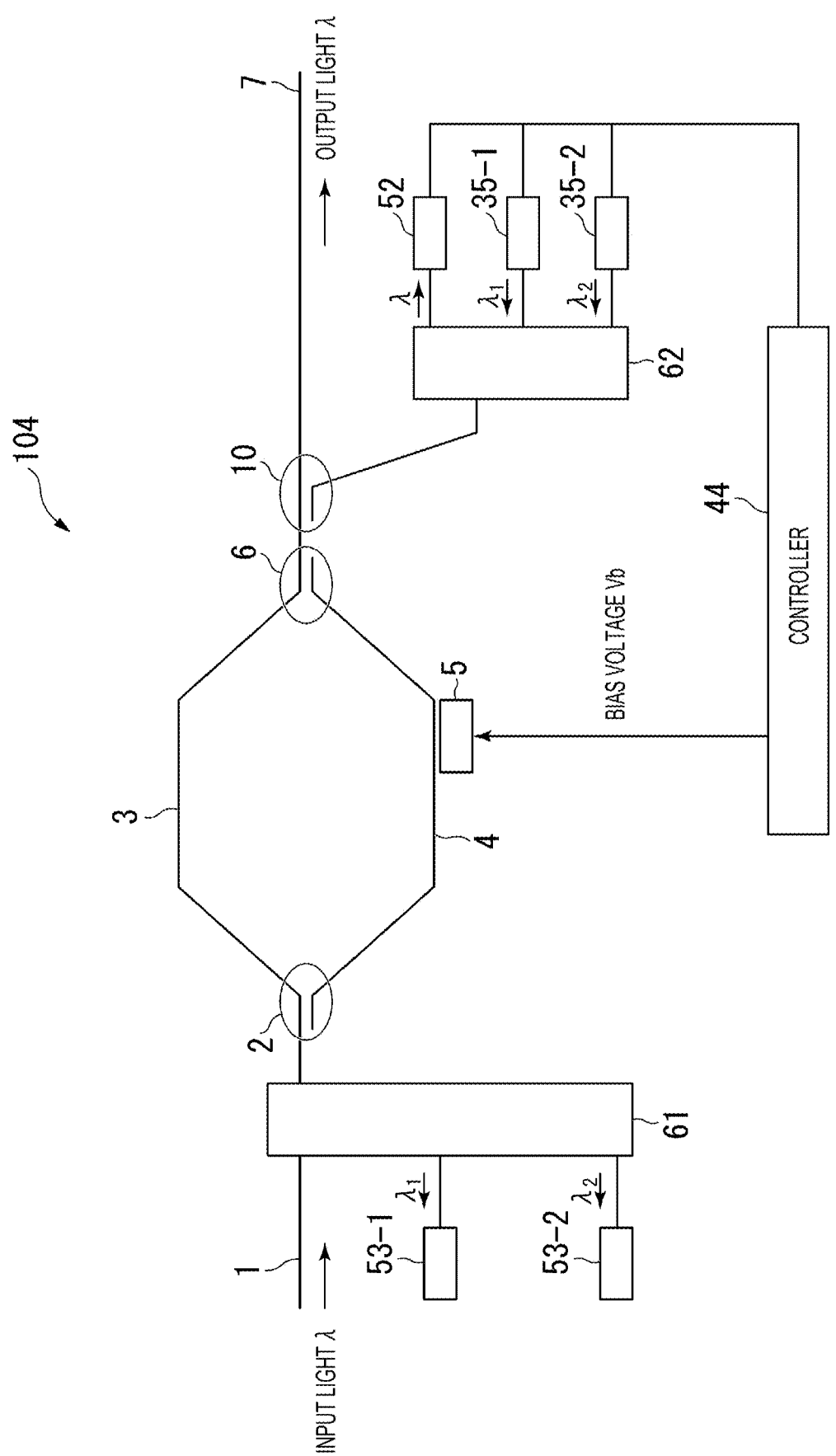
FIG. 6 is a diagram illustrating a configuration of an optical circuit according to a fourth embodiment.

FIG. 6 is a diagram illustrating a configuration of a light output circuit 104 according to the fourth embodiment. In the light output circuit 104 illustrated in FIG. 6, the same portions as those of the light output circuit 101 according to the first embodiment illustrated in FIG. 1 are denoted by the same reference numerals, and the description thereof will be omitted. MZI control according to the fourth embodiment and operation thereof will be described with reference to FIG. 6. Even in the light output circuit 104 illustrated in FIG. 6, an optical circuit to be subjected to the MZI control is an optical filter including a single MZI.

The configuration of the light output circuit 104 of the fourth embodiment illustrated in FIG. 6 is different from the configuration of the light output circuit 101 of the first embodiment illustrated in FIG. 1 in that a controller 44 is provided instead of the controller 41, a wavelength separation coupler 61 is provided instead of the wavelength multiplexing coupler 8, a wavelength multiplexing coupler 62 is provided instead of the wavelength separation coupler 13, N reference light sources 35 are connected to the wavelength multiplexing coupler 62, N reference light power monitors 53 are connected to the wavelength separation coupler 61, and the optical band pass filter 12 is not provided. In the present embodiment, a case of N=2 will be described as an example.

The wavelength separation coupler 61 outputs the input light having the wavelength λ, and the optical splitter circuit 2 branches the input light having the wavelength λ output from the wavelength separation coupler 61 into two. An optical multiplexing circuit 6 multiplexes the light propagated through the first optical waveguide 3 and the light propagated through the second optical waveguide 4, and outputs the multiplexed light having the wavelength λ to the output port 7. The optical tap circuit 10 taps the output light of the optical multiplexing circuit 6 to the optical filter. The wavelength multiplexing coupler 62 outputs the input light having the wavelength λ tapped by the optical tap circuit 10 to the optical power monitor 52.

On the other hand, the wavelength multiplexing coupler 62 inputs the first reference light output from the first reference light source 35-1 and the second reference light output from the second reference light source 35-2 to the optical filter in a direction opposite to the input light. The wavelength separation coupler 61 inputs the first reference light and second reference light that have passed through the MZI and have been output to the optical input port 1. The wavelength separation coupler 61 outputs the first reference light having the wavelength $\lambda_1$ to the first reference light power monitor 53-1, and outputs the second reference light having the wavelength $\lambda_2$ to the second reference light power monitor 53-2. As in the first embodiment, the controller 44 controls the bias voltage Vb on the basis of the monitoring results of the optical power monitor 52, the first reference light power monitor 53-1, and the second reference light power monitor 53-2.

As described above, the optical power monitor 52 monitors the input light that have passed through the optical filter and obtains the light output intensity $P(\lambda)$. The wavelength multiplexing coupler 62 multiplexes the first reference light to the N-th reference light and inputs the multiplexed light to the MZI in a direction opposite to the input light. The n-th reference light power monitor 53-$n$ monitors the n-th reference light having the wavelength $\lambda_n$ that have passed through the optical filter and is separated by the wavelength separation coupler 61, and obtains the light output intensity $P(\lambda_n)$. As in the first embodiment, the controller 44 controls the bias voltage Vb by using the light output intensity $P(\lambda)$, and the light output intensities $P(\lambda_1)$ to $P(\lambda_N)$.

The optical filter configured by the MZI has the same transmission characteristics even when the input and the output are switched. Therefore, even when the arrangement like the light output circuit 104 is made, the bias voltage Vb can be controlled by a procedure similar to that of the first embodiment. Furthermore, as compared with the first embodiment, there is an advantage that the optical band pass filter 12 can be omitted.

Variations of First to Fourth Embodiments

In the first to fourth embodiments, the optical filter including a single MZI is described. However, as described above, an optical modulator including a single MZI can be configured by disposing a modulation electrode on one or both of the first optical waveguide 3 and the second optical waveguide 4, adding a modulation signal, and using a nonlinear optical effect such as a Pockels effect. Even in this case, it is necessary to control the bias voltage Vb, and it is necessary to bias the MZI to Null, Quad, or the like according to a signal format. However, even in this case, the bias voltage Vb can be adjusted by the same method as that in the first to fourth embodiments.

However, in a case where the MZI is used as the modulator, it is necessary to pay attention to the fact that the output characteristic of the MZI is different from the output characteristics illustrated in FIG. 2. In FIG. 2, the light output intensity is extinguished when the optical path difference ΔL is at a Null point, and becomes the maximum intensity when the optical path difference ΔL is at a Peak point. However, in a case where modulation is applied to the MZI, the optical phase inside the MZI always varies around the operating point. Therefore, even when the optical path difference ΔL is at the Null point or the Peak point, the optical output is not completely extinguished or does not have the maximum intensity. However, the light output intensity is minimum or maximum within a possible range. Furthermore, according to the nonlinear optical effect used for modulation, the modulation efficiency strongly depends on the wavelength and the propagation direction of light. Therefore, the light intensity of the reference light having different wavelengths, particularly the light intensity of the reference light traveling in the opposite direction as in the fourth embodiment, is more complicated than the transmission characteristics illustrated in FIG. 2.

However, even in such a case, the intensity of the light output is fixed by the optical path difference ΔL and the wavelength. Therefore, in the training period described in the first embodiment, the controllers 41 to 44 can control the bias voltage Vb by performing training of changes in various light output intensities of the light output intensities $P(\lambda)$ and the light output intensities $P(\lambda_1)$ to $P(\lambda_N)$ accompanying the variation of the optical path difference ΔL, for example, changes in various light output intensities of $P(\lambda_1)$, $P(\lambda)$, and $P(\lambda_2)$ in a case of N=2.

Furthermore, in the first to fourth embodiments, the optical circuit to be subjected to MZI control includes a single MZI, but may include a plurality of MZIs. The controller controls at least one optical path difference among optical path differences of two optical paths included in each of a plurality of the MZIs. It is desirable that an interval between each of the wavelengths of the N types of reference light and the wavelength of the input light does not coincide with any free spectrum range of an MZI group included in the optical circuit.

Fifth Embodiment

In the above-described embodiment, the optical circuit to be subjected to the MZI control includes a single MZI. The optical circuit to be subjected to the MZI control in the present embodiment includes a plurality of nested MZIs.

Figure 7:
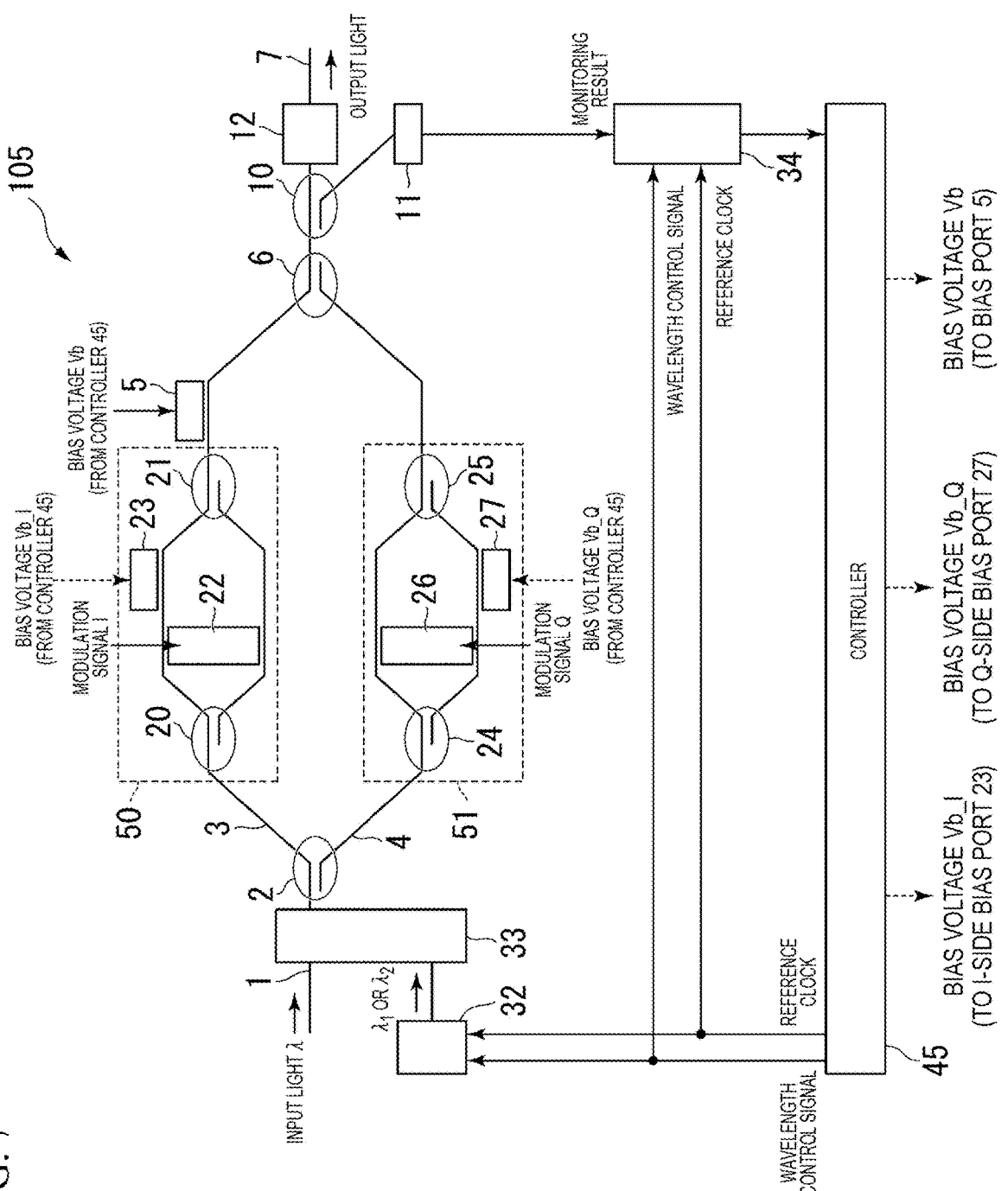
FIG. 7 is a diagram illustrating a configuration of an optical circuit according to a fifth embodiment.

FIG. 7 is a diagram illustrating a configuration of a light output circuit 105 according to the fifth embodiment. MZI control according to the fifth embodiment and operation thereof will be described with reference to FIG. 7. In the light output circuit 105 illustrated in FIG. 7, the optical circuit to be subjected to MZI control is not a single MZI but a nested MZI group configuring an optical IQ modulator. The light output circuit 105 of the fifth embodiment has a configuration in which a single MZI in the light output circuit 103 of the third embodiment illustrated in FIG. 4 is replaced with an optical IQ modulator 92 to be illustrated in FIG. 12.

Figure 12:
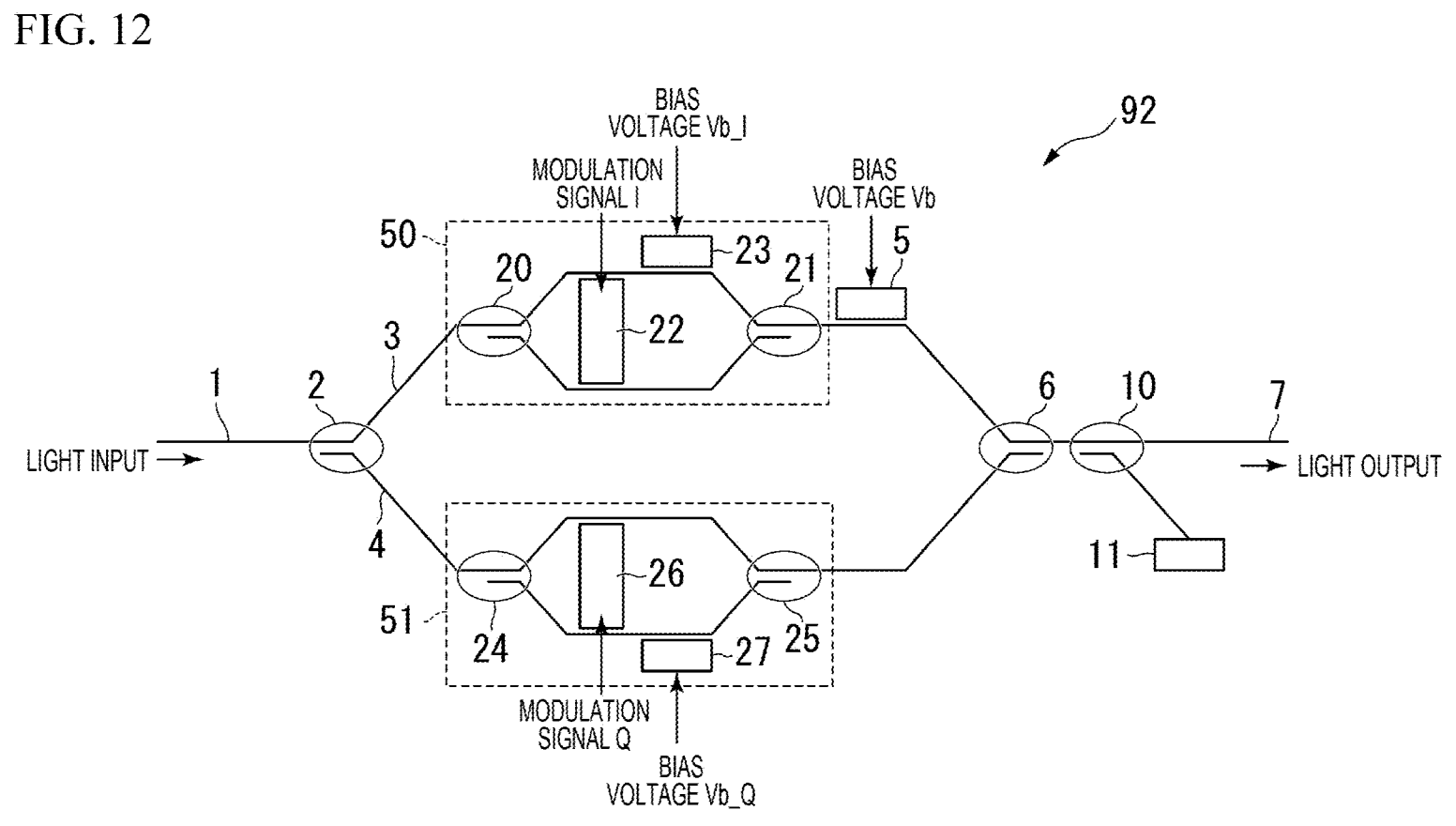

That is, the configuration of the light output circuit 105 illustrated in FIG. 7 is different from the configuration of the optical IQ modulator 92 illustrated in FIG. 12 in that a control circuit including a wavelength variable light source 32, an optical coupler 33, an optical power monitor 11, an optical band pass filter 12, a synchronous detection/averaging processing circuit 34, and a controller 45 is provided. The wavelength variable light source 32, the optical coupler 33, the optical power monitor 11, the optical band pass filter 12, and the synchronous detection/averaging processing circuit 34 operate as in the third embodiment.

In order to generate a QAM signal, as described above, the optical path difference of the in-phase MZI 50 is biased by a bias voltage Vb_I applied via an I-side bias port 23 so as to be extinguished at the moment when a modulation signal I is zero. Furthermore, the optical path difference of the quadrature MZI 51 is biased by a bias voltage Vb_Q applied via a Q-side bias port 27 so as to be extinguished at the moment when the modulation signal Q is zero.

Here, the optical path difference of the In-Phase MZI 50 at the moment when the modulation signal I and the modulation signal Q are zero is defined as ΔL_I, and the optical path difference of the quadrature MZI 51 is defined as ΔL_Q.

When $m_I$ and $m_Q$ are integers of zero or more, Expressions (1) and (2) below is to be satisfied in order to satisfy the above-described conditions.

$$\Delta L\_I = \pm \lambda/2 \times (2m_I + 1) \tag{1}$$

$$\Delta L\_Q = \pm \lambda/2 \times (2m_Q + 1) \tag{2}$$

In the present embodiment, $m_I$ and $m_Q$ are set to be different values in the training period described above.

In the following simulation, it is assumed that $m_I$=0 and $m_Q$=1 are set, and ΔL_I=−0.5λ and ΔL_Q=1.5λ are selected in the training period. Furthermore, the difference in optical phase between the optical output of the in-phase MZI 50 and the optical output of the quadrature MZI 51 also needs to be set to $\pm \pi/4 + \pi \times m_{ph}$ in the training period described above. In the following simulation, it is assumed that $m_{ph}$=0 is set, and the optical path difference ΔL_Ph of the parent MZI of the light output circuit 105=−0.25λ is selected in the training period.

Figure 8:
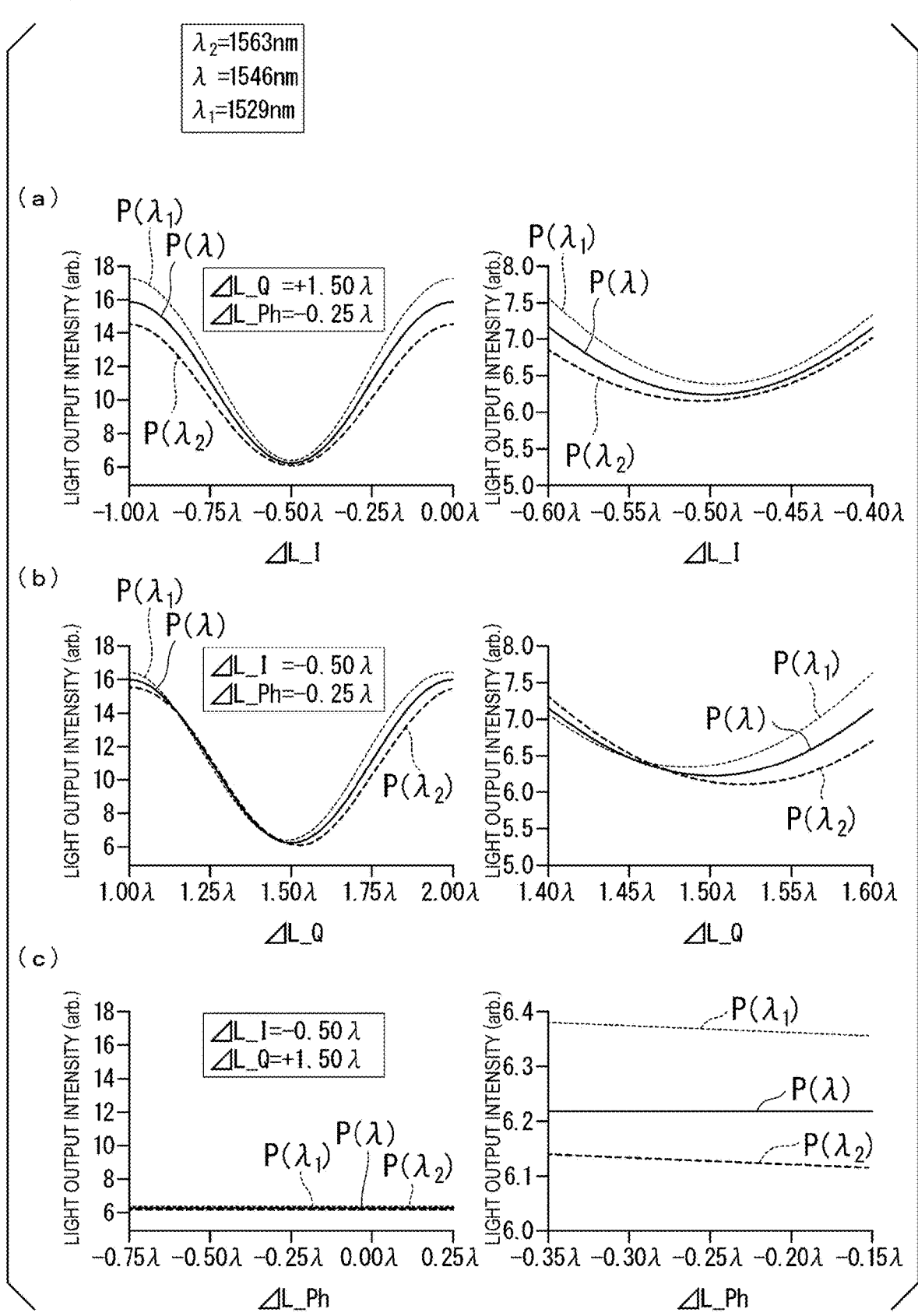
FIG. 8 is a diagram illustrating a simulation result of an optical circuit according to the fifth embodiment.

FIG. 8 is a diagram illustrating a simulation result of the variation of the light output intensities $P(\lambda_2)$, $P(\lambda)$, and $P(\lambda_1)$ of each of the input light and two reference lights of the first reference light and the second reference light when the bias drift occurs. Here, $\lambda_2$ is 1563 nm, $\lambda$ is 1546 nm, and $\lambda_1$ is 1529 nm. Furthermore, it is assumed that the QAM signal has a 16-value.

FIG. 8(a) illustrates a change in a case where the bias drift occurs in an optical path difference ΔL_I adjusted by the bias voltage Vb_I. A horizontal axis indicates a change in the optical path difference ΔL_I. The center of the horizontal axis is ΔL_I=−0.5λ of the set target. A vertical axis indicates the light output intensity. The graph on the right side of FIG. 8(a) is an enlarged view of the vicinity of the set target of the graph on the left side of FIG. 8(a). Unlike FIG. 2, since the light is randomly modulated, even when the optical path difference ΔL_I is optimal, the light is not completely extinguished. Furthermore, since the modulation efficiency also has wavelength dependency, the maximum light intensities of $P(\lambda_2)$, $P(\lambda)$, and $P(\lambda_1)$ do not coincide with each other.

FIG. 8(b) illustrates a change in a case where the bias drift occurs in an optical path difference ΔL_Q adjusted by the bias voltage Vb_Q. A horizontal axis indicates a change in the optical path difference ΔL_Q. The center of the horizontal axis is ΔL_Q=1.5λ of the set target. A vertical axis indicates the light output intensity. The graph on the right side of FIG. 8(b) is an enlarged view of the vicinity of the set target of the graph on the left side of FIG. 8(b).

FIG. 8(*c*) illustrates a change in a case where the bias drift occurs in an optical path difference ΔL_Ph adjusted by the bias voltage Vb. A horizontal axis indicates a change in the optical path difference ΔL_Ph. The center of the horizontal axis is ΔL_Ph=−0.25λ of the set target. A vertical axis indicates the light output intensity. The graph on the right side of FIG. 8(*c*) is also an enlarged view of the vicinity of the set target of the graph on the left side of FIG. 8(*c*). However, it should be noted that the scale of the vertical axis is different from those in FIG. 8(*a*) and FIG. 8(*b*).

Figure 9:
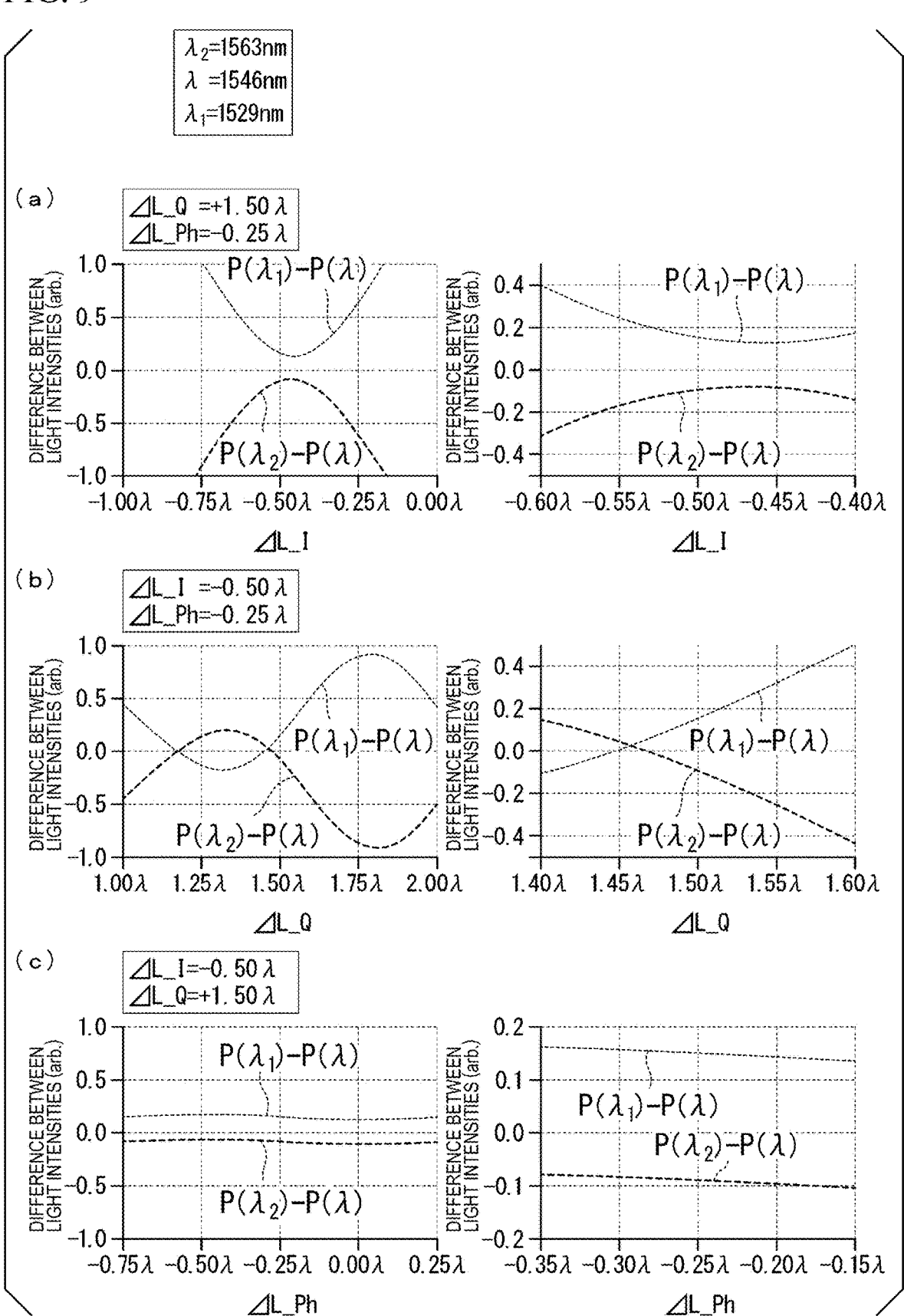
FIG. 9 is a diagram illustrating a simulation result of an optical circuit according to the fifth embodiment.

It is possible to determine which bias is drifted by the relative relationship among three types of light intensities P(λ₂), P(λ), and P(λ₁). FIG. 9 is a diagram describing this more clearly. The parameters of the simulation and each horizontal axis are the same as the parameters in FIG. 8 and each horizontal axis. However, what is plotted in FIG. 9 is not three types of light intensities but the difference between two types of light output intensities of P(λ₂)–P(λ) and P(λ₁)–P(λ). In FIG. 9, the difference between the light output intensities is illustrated as a function of each of the optical path differences ΔL_I, ΔL_Q, and ΔL_Ph.

Looking at an inclination in the vicinity of the center of the horizontal axis in FIG. 9(*a*), when the optical path difference ΔL_I adjusted by the bias voltage Vb_I starts to increase due to a drift from the optimum value of −0.5λ as a set target, P(λ₂)–P(λ) increases, but P(λ₁)–P(λ) decreases.

Looking at an inclination in the vicinity of the center of the horizontal axis in FIG. 9(*b*), when the optical path difference ΔL_Q adjusted by the bias voltage Vb_Q starts to increase due to a drift from the optimum value of 1.5λ as a set target, P(λ₂)–P(λ) decreases, but P(λ₁)–P(λ) increases.

Looking at an inclination in the vicinity of the center of the horizontal axis in FIG. 9(*c*), when the optical path difference ΔL_Ph adjusted by the bias voltage Vb starts to increase due to a drift from the optimum value of −0.25λ as a set target, both P(λ₂)–P(λ) and P(λ₁)–P(λ) decreases.

The controller 45 can determine these pieces of information to determine which bias is to be corrected. However, this determination is not limitlessly possible, and occurrence of a drift having a certain degree or more of magnitude leads to erroneous determination. In FIG. 9(*a*), when the optical path difference ΔL_I drifts from the optimum value of −0.5λ to reach −0.45λ, the inclination of P(λ₂)–P(λ) and the inclination of P(λ₁)–P(λ) are reversed. Therefore, the allowable error at the end of the training period is sufficiently smaller than 0.05λ (corresponding to 0.1π in the optical phase). Moreover, when the drift occurs, it is necessary to quickly correct the magnitude of the drift to an optimum value before the magnitude of the drift reaches 0.05λ.

Sixth Embodiment

In the fifth embodiment, when ΔL_I=±λ/2×(2m_I+1) and ΔL_Q=±λ/2×(2m_Q+1) are set, m_I and m_Q are set to be different values in the training period. However, the dynamic range of a voltage that can be applied with the bias voltage Vb_I and the bias voltage Vb_Q has a limit due to the device configuration. Therefore, it may be technically impossible to set m_I and m_Q to have different values.

In a case where m_I and m_Q have the same value, there is no essential difference between the behavior of the in-phase MZI 50 and the behavior of the quadrature MZI 51. Therefore, it is impossible to discriminate the drift of the optical path difference ΔL_I from the drift of the optical path difference ΔL_Q. The reason is that the changes in the light output intensities P(λ₁), P(λ), and P(λ₂) in a case of ΔL_I=ΔL_Q are the same as those in a case where the optical path difference ΔL_I increases and in a case where the optical path difference ΔL_Q increases, and are the same as those in a case where the optical path difference ΔL_I decreases and in a case where the optical path difference ΔL_Q decreases. Alternatively, the reason is that the changes in P(λ₁), P(λ), and P(λ₂) in a case of ΔL_I=ΔL_Q are the same as those in a case where the optical path difference ΔL_I increases and in a case where the optical path difference ΔL_Q decreases, and are the same as those in a case where the optical path difference ΔL_I decreases and in a case where the optical path difference ΔL_Q increases.

In order to solve this problem, the following control procedure is performed. In the following description, it is assumed that the drive amplitude of the modulator is small enough to ignore nonlinearity of the modulator. In a case where it is determined that either the optical path difference ΔL_I or the optical path difference ΔL_Q increases, first, the controller 45 slightly changes the bias voltage Vb_I so as to decrease ΔL_I. Alternatively, in a case where it is determined that either the optical path difference ΔL_I or the optical path difference ΔL_Q decreases, first, the controller 45 slightly changes the bias voltage Vb_I so as to increase ΔL_I. As a result, when the light output intensity P(λ) decreases, the controller 45 can determine that the optical path difference ΔL_I is drifted.

On the contrary, when the light output intensity P(λ) increases as a result of the slight change of the bias voltage Vb_I, the controller 45 can determine that the optical path difference ΔL_Q is drifted. Therefore, the controller 45 quickly returns the bias voltage Vb_I to the original value. Then, the controller 45 corrects the optical path difference ΔL_I or the optical path difference ΔL_Q in which the drift has occurred until the values returns to the values of the light output intensities P(λ₁), P(λ), and P(λ₂) trained at the end of the training period. As a result, the controller 45 of the light output circuit 105 performs control to correct the optical path difference ΔL_I or the optical path difference ΔL_Q such that the light output intensity P(λ) decreases. As described above, it is assumed that the drive amplitude of the modulator is small enough to ignore nonlinearity of the modulator. However, in the case of a relatively simple signal format such as a four-value QAM signal, since the penalty due to nonlinearity of the modulator is small, the drive amplitude of the modulator may be increased. In such a case, the light output intensity P(λ) increases when the bias voltage Vb_I or the bias voltage Vb_Q is the best. Therefore, in a case where the signal format is used, the controller 45 of the light output circuit 105 performs control to correct the optical path difference ΔL_I or the optical path difference ΔL_Q such that the light output intensity P(λ) increases.

According to the present embodiment, it is possible to optimally adjust a bias of the optical filter including a single MZI or a plurality of the MZIs or a bias of the optical modulator without applying a periodic minute variation due to a pilot tone (dithering) to a single or a plurality of bias voltages. Therefore, it is possible to suppress optical noise superimposed on the optical signal due to minute variation of the bias voltage.

According to the above-described embodiment, the control circuit controls at least one optical path difference among optical path differences of two optical paths included in a single MZI or each of a plurality of the MZIs included in the optical circuit. A reference light generation unit generates the reference light respectively having N types (N is a natural number) of wavelengths λ₁ to λ_N different from the wavelength λ of the input light input to the optical circuit in parallel or in a time division manner. The reference light generation unit corresponds to, for example, the first reference light source 35-1 to the N-th reference light source 35-N and the wavelength variable light source 32 according to the embodiment. A reference light input unit inputs the reference light to the optical circuit. The reference light input unit corresponds to, for example, the wavelength multiplexing coupler 8, the optical coupler 33, and the wavelength multiplexing coupler 62 according to the embodiment. An optical power monitor unit monitors the light intensity of propagated input light which is input light after being propagated through the single MZI or a plurality of the MZIs in the optical circuit, and the light intensity of propagated reference light which is reference light after being propagated through the single MZI or a plurality of the MZIs through which the propagated input light is propagated, or the light intensity of light obtained by multiplexing the propagated input light and the propagated reference light. The optical power monitor unit corresponds to, for example, the optical power monitor 52, the N-th reference light power monitor to the N-th reference light power monitor 53-N, and the optical power monitor 11 according to the embodiment. The controller performs control to correct the optical path difference on the basis of the light intensity $P(\lambda)$ of the propagated input light having the wavelength $\lambda$ and the light intensities $P(\lambda_1)$ to $P(\lambda_N)$ of the propagated reference light respectively having the N types of wavelengths $\lambda_1$ to $\lambda_N$, which are obtained using the monitoring result by the optical power monitor unit. That is, the controller compares the light intensity $P(\lambda)$ of the propagated input light with the light intensities $P(\lambda_1)$ to $P(\lambda_N)$ of n types of propagated reference light to determine whether or not the optical path difference between two optical paths included in the single MZI or each of a plurality of the MZIs is the target value, and corrects the optical path difference in a case where the optical path difference is not the target value. Alternatively, the controller performs control to correct the optical path difference on the basis of the light intensities $P(\lambda_1)$ to $P(\lambda_N)$ of the propagated reference light respectively having the N types of wavelengths $\lambda_1$ to $\lambda_N$, which are obtained using the monitoring result by the optical power monitor unit.

The reference light input unit may multiplex N types of reference light with the input light, and input the multiplexed light to the optical circuit. In this case, the control circuit may further include a wavelength separation unit. The wavelength separation unit wavelength-separates the propagated input light and N types of propagated reference light, which are multiplexed and output from the optical circuit. The wavelength separation unit is, for example, the wavelength separation coupler 13 of the embodiment. The optical power monitor unit detects the light intensity of the propagated input light and each of the N types of propagated reference light which are separated by the wavelength separation unit.

The controller may control extinction of the reference light and generation of the reference light in the time division manner in the reference light generation unit. The reference light input unit multiplexes the reference light generated in the time division manner with the input light, and inputs the multiplexed light to the optical circuit. The optical power monitor unit outputs, to the controller, the light intensity $P(\lambda)$ obtained by monitoring the propagated input light having the wavelength $\lambda$ and the light intensity $P(\lambda, \lambda_n)$ obtained by monitoring the light obtained by multiplexing the propagated input light having the wavelength $\lambda$ with the propagated reference light having the wavelength $\lambda_n$ (n is a natural number of one or more and N or less). The controller compares and calculates the light intensity $P(\lambda)$ and the light intensity $P(\lambda, \lambda_n)$ to calculate the light intensities $P(\lambda_1)$ to $P(\lambda_N)$ of the reference light respectively having the wavelengths $\lambda_1$ to $\lambda_N$.

The controller may control generation of the reference light in the time division manner in the reference light generation unit. The reference light input unit multiplexes the reference light with the input light, and inputs the multiplexed light to the optical circuit. The optical power monitor unit outputs, to the controller, the light intensity $P(\lambda, \lambda_n)$ obtained by monitoring the light obtained by multiplexing the propagated input light having the wavelength $\lambda$ with the propagated reference light having the wavelength $\lambda_n$ (n is a natural number of one or more and N or less). The controller calculates the light intensities $P(\lambda_1)$ to $P(\lambda_N)$ of the propagated reference light respectively having the wavelengths $\lambda_1$ to $\lambda_N$ on the basis of the light intensity $P(\lambda, \lambda_n)$ The controller may control extinction of the reference light and generation of the optical pulse train of the reference light with a pulse train in the reference light generation unit. The reference light input unit multiplexes the optical pulse train of the reference light generated in the time division manner with the input light, and inputs the multiplexed light to the optical circuit. The control circuit further includes a synchronous detection unit (hereinafter also referred to as "synchronous detector"). The synchronous detection unit corresponds to the synchronous detection/averaging processing circuit 34 of the embodiment. The synchronous detection unit averages the results obtained by monitoring the light output from the optical circuit by the optical power monitor unit while the reference light generation unit extinguishes the light to acquire the light intensity $P(\lambda)$ of the propagated input light having the wavelength $\lambda$, and synchronously detects the results obtained by monitoring the light output from the optical circuit by the optical power monitor unit while the reference light generation unit generates the optical pulse train of the reference light having the wavelength $\lambda_n$ (n is a natural number of one or more and N or less) by using the reference clock used to generate the optical pulse train to acquire the light intensity $P(\lambda_n)$ of the propagated reference light having the wavelength $\lambda_n$.

In a case where the reference light generated by the reference light generation unit is the optical pulse train, the controller may control extinction of the reference light and generation of the optical pulse train in the reference light generation unit. The cycle and phase of the optical pulse train of the reference light are determined by a reference clock output by the controller. The reference light input unit multiplexes the optical pulse train of the reference light generated in the time division manner with the input light, and inputs the multiplexed light to the optical circuit. The control circuit further includes a synchronous detection unit. The synchronous detection unit averages the results obtained by monitoring the light output from the optical circuit by the optical power monitor unit while the reference light generation unit extinguishes light to acquire the light intensity $P(\lambda)$ of the propagated input light having the wavelength $\lambda$, and synchronously detects the results obtained by monitoring the light output from the optical circuit by the optical power monitor unit while the reference light generation unit generates the optical pulse train of the reference light having the wavelength $\lambda_n$ (n is a natural number of one or more and N or less) by using the reference clock used to generate the optical pulse train to acquire the light intensity $P(\lambda_n)$ of the propagated reference light having the wavelength An.

In a case where the reference light generated by the reference light generation unit is the optical pulse train, the controller may control generation of the optical pulse train of the reference light in the reference light generation unit. The cycle and phase of the optical pulse train of the reference light are determined by a reference clock output by the controller. The reference light input unit multiplexes the optical pulse train of the reference light generated in the time division manner with the input light, and inputs the multiplexed light to the optical circuit. The control circuit further includes a synchronous detection unit. The synchronous detection unit synchronously detects the results obtained by monitoring the light output from the optical circuit by the optical power monitor unit while the reference light generation unit generates the optical pulse train of the reference light having the wavelength $\lambda_n$ by using the reference clock used to generate the optical pulse train to acquire the light intensity $P(\lambda_n)$ of the propagated reference light having the wavelength $\lambda_n$ (n is a natural number of one or more and N or less).

The reference light may be propagated through the single MZI or the plurality of the MZIs through which the input light is propagated in a direction opposite to the input light.

An interval between each of the wavelengths of the N types of reference light and the wavelength of the input light may not coincide with any free spectrum range of the single MZI or the plurality of the MZIs of the optical circuit.

In a case where the optical path difference is set such that the interference intensity of the input light having the wavelength $\lambda$ is maximized in the single or any one of the plurality of the MZIs of the optical circuit, the optical path difference may be k times the wavelength $\lambda$ (k is an integer excluding zero).

The optical circuit may be an optical modulator. In this case, a modulation signal is applied to at least one of the single MZI or the plurality of the MZIs of the optical circuit.

The optical circuit may be an optical IQ modulator having a nested MZI in which an in-phase MZI is disposed on one optical path of two optical paths in the parent MZI and a quadrature MZI is disposed on the other optical path. In the in-phase MZI, the optical path difference is set to $\pm\lambda/2 \times (2m_I+1)$ such that the light having the wavelength $\lambda$ is extinguished at the moment when the modulation signal is zero. In the quadrature MZI, the optical path difference is set to $\pm\lambda/2 \times (2m_Q+1)$ such that the light having the wavelength $\lambda$ is extinguished at the moment when the modulation signal is zero. $m_I$ and $m_Q$ are mutually different integers of zero or more.

The optical circuit may be an optical IQ modulator having a nested MZI in which an in-phase MZI is disposed on one optical path of two optical paths in the parent MZI and a quadrature MZI is disposed on the other optical path. In the in-phase MZI and the quadrature MZI, the optical path difference of the in-phase MZI and the optical path difference of the quadrature MZI are set to an odd multiple of $\pm\lambda/2$ such that the light having the wavelength $\lambda$ is extinguished at the moment where the modulation signal is zero. In this case, the controller performs control to correct the optical path difference of the in-phase MZI or the optical path difference of the quadrature MZI such that the light intensity $P(\lambda)$ of the propagated input light having the wavelength $\lambda$ output from the optical circuit decreases or increases.

Although the embodiment of the present invention has been described in detail with reference to the drawings, specific configurations are not limited to the embodiment and include design and the like without departing from the gist of the present invention.

REFERENCE SIGNS LIST

1 Optical input port
2 Optical splitter

3 First optical waveguide
4 Second optical waveguide
5 bias port
6 Optical multiplexing circuit
7 Output port
8 Wavelength multiplexing coupler
10 Optical tap circuit
11 Optical power monitor
12 Optical band pass filter
13 Wavelength separation coupler
20 I-side optical splitter circuit
21 I-side optical multiplexing circuit
22 I-side modulation electrode
23 I-side bias port
24 Q-side optical splitter circuit
25 Q-side optical multiplexing circuit
26 Q-side modulation electrode
27 Q-side bias port
32 Wavelength variable light source
33 Optical coupler
34 Synchronous detection/averaging processing circuit
35-1 First reference light source
35-2 Second reference light source
41 Controller
42 Controller
43 Controller
44 Controller
45 Controller
50 In-phase MZI
51 Quadrature MZI
52 Optical power monitor
53-1 First reference light power monitor
53-2 Second reference light power monitor
61 Wavelength separation coupler
62 Wavelength multiplexing coupler
91 MZI
92 Optical IQ modulator
101 Light output circuit
102 Light output circuit
103 Light output circuit
104 Light output circuit
105 Light output circuit

The invention claimed is:

1. A control circuit that controls at least one optical path difference among optical path differences of two optical paths of a single Mach-Zehnder interferometer or each of a plurality of the Mach-Zehnder interferometers included in an optical circuit, the control circuit comprising:

a reference light generator configured to generate reference light having N types of wavelengths $\lambda_1$ to $\lambda_N$ each being different from a wavelength $\lambda$ of input light input to the optical circuit in parallel or in a time division manner where N is a natural number;

a reference light input circuitry configured to input the reference light to the optical circuit;

an optical power monitor configured to monitor a light intensity of propagated input light which is the input light that has been propagated through the single Mach-Zehnder interferometer or a plurality of the Mach-Zehnder interferometers, and at least one of a light intensity of propagated reference light which is the reference light that has been propagated through the single Mach-Zehnder interferometer or a plurality of the Mach-Zehnder interferometers through which the propagated input light has been propagated, and a light intensity of light obtained by multiplexing the propagated input light and the propagated reference light; and a controller configured to perform control to correct the optical path difference on a basis of a light intensity $P(\lambda)$ of the propagated input light having the wavelength $\lambda$ and light intensities $P(\lambda_1)$ to $P(\lambda_N)$ of the propagated reference light having the N types of wavelengths $\lambda_1$ to $\lambda_N$, which are obtained using a monitoring result by the optical power monitor.

2. The control circuit according to claim 1, wherein the reference light input circuitry multiplexes N types of the reference light with the input light and inputs the multiplexed light to the optical circuit, the control circuit further includes a wavelength separator configured to wavelength-separates the propagated input light and N types of the propagated reference light which have been multiplexed and have been output from the optical circuit, and the optical power monitor detects the light intensity of the propagated input light and light intensities of the N types of the propagated reference light, which have been separated by the wavelength separator.

3. The control circuit according to claim 1, wherein the controller controls extinction of the reference light and generation of the reference light in the time division manner in the reference light generator, the reference light input circuitry multiplexes the reference light with the input light and inputs the multiplexed light to the optical circuit, the optical power monitor unit outputs, to the controller, the light intensity $P(\lambda)$ obtained by monitoring the propagated input light having the wavelength $\lambda$ and the light intensity $P(\lambda, \lambda_n)$ obtained by monitoring the light obtained by multiplexing the propagated input light having the wavelength $\lambda$ and the propagated reference light having the wavelength $\lambda_n$ where n is a natural number of one or more and N or less, and the controller calculates the light intensities $P(\lambda_1)$ to $P(\lambda_N)$ of the propagated reference light having the wavelengths $\lambda_1$ to $\lambda_N$ on a basis of the light intensity $P(\lambda)$ and the light intensity $P(\lambda, \lambda_n)$.

4. The control circuit according to claim 1, wherein the controller controls extinction of the reference light and generation of an optical pulse train of the reference light by using a pulse train, the reference light input circuitry multiplexes the optical pulse train of the reference light having been generated in the time division manner with the input light, and inputs the multiplexed light to the optical circuit, and the control circuit further includes a synchronous detector configured to, where n is a natural number of one or more and N or less, average results obtained by monitoring the light output from the optical circuit by the optical power monitor while the reference light generator extinguishes the light to acquire the light intensity $P(\lambda)$ of the propagated input light having the wavelength $\lambda$, and synchronously detect results obtained by monitoring the light output from the optical circuit by the optical power monitor while the reference light generator generates the optical pulse train of the reference light having the wavelength $\lambda_n$ by using a reference clock used to generate the optical pulse train to acquire the light intensity $P(\lambda_n)$ of the propagated reference light having the wavelength $\lambda_n$.

5. The control circuit according to claim 1, wherein the reference light generated by the reference light generator is an optical pulse train, the controller controls extinction of the reference light and generation of the optical pulse train in the reference light generator, a cycle and phase of the optical pulse train of the reference light are determined by a reference clock generated by the controller, the reference light input circuitry multiplexes the optical pulse train of the reference light generated in the time division manner with the input light, and inputs the multiplexed light to the optical circuit, and the control circuit further includes a synchronous detector configured to, where n is a natural number of one or more and N or less, average results obtained by monitoring the light output from the optical circuit by the optical power monitor while the reference light generator extinguishes light to acquire the light intensity $P(\lambda)$ of the propagated input light having the wavelength $\lambda$, and synchronously detect results obtained by monitoring the light output from the optical circuit by the optical power monitor while the reference light generator generates the optical pulse train of the reference light having the wavelength $\lambda_n$ by using the reference clock used to generate the optical pulse train to acquire the light intensity $P(\lambda_n)$ of the propagated reference light having the wavelength $\lambda_n$.

6. The control circuit according to claim 1, wherein the reference light is propagated through the single Mach-Zehnder interferometer or the plurality of the Mach-Zehnder interferometers through which the input light is propagated in a direction opposite to the input light.

7. The control circuit according to claim 1, wherein an interval between each of the wavelengths of the N types of reference light and the wavelength of the input light does not coincide with any free spectrum range of the single Mach-Zehnder interferometer or any of the plurality of the Mach-Zehnder interferometers of the optical circuit.

8. The control circuit according to claim 1, wherein in the single Mach-Zehnder interferometer or any one of the plurality of the Mach-Zehnder interferometers of the optical circuit, in a case where the optical path difference is set such that an interference intensity of the input light having the wavelength $\lambda$ is maximized, the optical path difference is k times the wavelength $\lambda$ where k is an integer excluding zero.

9. The control circuit according to claim 1, wherein the optical circuit is an optical modulator, and a modulation signal is applied to the signal Mach-Zehnder interferometer or at least one of the plurality of the Mach-Zehnder interferometers.

10. The control circuit according to claim 9, wherein the optical circuit is an optical IQ modulator having a nested Mach-Zehnder interferometer in which an in-phase Mach-Zehnder interferometer is disposed on one optical path of two optical paths in a parent Mach-Zehnder interferometer and a quadrature Mach-Zehnder interferometer is disposed on the other optical path, in the in-phase Mach-Zehnder interferometer, an optical path difference is set to $\pm\lambda/2\times(2m_I+1)$ such that light having the wavelength $\lambda$ is extinguished in a case where the modulation signal is zero, in the quadrature phase Mach-Zehnder interferometer, the optical path difference is set to $\pm\lambda/2\times(2m_Q+1)$ such that light having the wavelength $\lambda$ is extinguished in a case where the modulation signal is zero, and the $m_I$ and the $m_Q$ are mutually different integers of zero or more.

11. The control circuit according to claim 9, wherein the optical circuit is an optical IQ modulator having a nested Mach-Zehnder interferometer in which an in-phase Mach-Zehnder interferometer is disposed on one optical path of two optical paths in a parent Mach-Zehnder interferometer and a quadrature Mach-Zehnder interferometer is disposed on the other optical path, in the in-phase Mach-Zehnder interferometer and the quadrature Mach-Zehnder interferometer, the optical path difference of the in-phase Mach-Zehnder interferometer and an optical path difference of the quadrature-phase Mach-Zehnder interferometer are set to an odd multiple of $\pm\lambda/2$ such that light having the wavelength $\lambda$ is extinguished in a case where the modulation signal is zero, and the controller performs control to correct the optical path difference of the in-phase Mach-Zehnder interferometer or the optical path difference of the quadrature Mach-Zehnder interferometer such that the light intensity $P(\lambda)$ of the propagated input light having the wavelength $\lambda$ output from the optical circuit decreases or increases.

12. A control circuit that controls at least one optical path difference among optical path differences of two optical paths of a single Mach-Zehnder interferometer or each of a plurality of the Mach-Zehnder interferometers included in an optical circuit, the control circuit comprising:

a reference light generator configured to generate reference light having N types of wavelengths $\lambda_1$ to $\lambda_N$ each being different from a wavelength $\lambda$ of input light input to the optical circuit in parallel or in a time division manner where N is a natural number;

a reference light input circuitry configured to input the reference light to the optical circuit;

an optical power monitor configured to monitor a light intensity of propagated input light which is the input light that has been propagated through the single Mach-Zehnder interferometer or a plurality of the Mach-Zehnder interferometers, and at least one of a light intensity of propagated reference light which is the reference light that has been propagated through the single Mach-Zehnder interferometer or a plurality of the Mach-Zehnder interferometers through which the propagated input light has been propagated, and a light intensity of light obtained by multiplexing the propagated input light and the propagated reference light; and a controller configured to perform control to correct the optical path difference on a basis of light intensities $P(\lambda_1)$ to $P(\lambda_N)$ of the propagated reference light having the N types of wavelengths $\lambda_1$ to $\lambda_N$, which are obtained using a monitoring result by the optical power monitor.

13. The control circuit according to claim 12, wherein the controller controls generation of the reference light in the time division manner in the reference light generator, the reference light input circuitry multiplexes the reference light with the input light, and inputs the multiplexed light to the optical circuit, the optical power monitor unit outputs, to the controller, the light intensity $P(\lambda, \lambda_n)$ obtained by monitoring the light obtained by multiplexing the propagated input light having the wavelength $\lambda$ and the propagated reference light having the wavelength $\lambda_n$ where n is a natural number of one or more and N or less, and the controller calculates the light intensities $P(\lambda_1)$ to $P(\lambda_N)$ of the propagated reference light having wavelengths $\lambda_1$ to $\lambda_N$ on a basis of the light intensity $(\lambda, \lambda_n)$.

14. The control circuit according to claim 12, wherein the reference light generated by the reference light generator is an optical pulse train, the controller controls generation of the optical pulse train of the reference light in the reference light generator, a cycle and phase of the optical pulse train of the reference light are determined by a reference clock generated by the controller, the reference light input circuitry multiplexes the optical pulse train of the reference light generated in the time division manner with the input light, and inputs the multiplexed light to the optical circuit, and the control circuit further includes a synchronous detector configured to, where n is a natural number of one or more and N or less, synchronously detect results obtained by monitoring the light output from the optical circuit by the optical power monitor while the reference light generator generates the optical pulse train of the reference light having the wavelength $\lambda_n$ by using the reference clock used to generate the optical pulse train to acquire the light intensity $P(\lambda_n)$ of the propagated reference light having the wavelength $\lambda_n$.

15. The control circuit according to claim 12, wherein the reference light input circuitry multiplexes N types of the reference light with the input light and inputs the multiplexed light to the optical circuit, the control circuit further includes a wavelength separator configured to wavelength-separates the propagated input light and N types of the propagated reference light which are multiplexed and output from the optical circuit, and the optical power monitor detects the light intensity of the propagated input light and light intensities of the N types of the propagated reference light, which are separated by the wavelength separator.

16. The control circuit according to claim 12, wherein the reference light is propagated through the single Mach-Zehnder interferometer or the plurality of the Mach-Zehnder interferometers through which the input light is propagated in a direction opposite to the input light.

17. The control circuit according to claim 12, wherein an interval between each of the wavelengths of the N types of reference light and the wavelength of the input light does not coincide with any free spectrum range of the single Mach-Zehnder interferometer or any of the plurality of the Mach-Zehnder interferometers of the optical circuit.

18. The control circuit according to claim 12, wherein in the single Mach-Zehnder interferometer or any one of the plurality of the Mach-Zehnder interferometers of the optical circuit, in a case where the optical path difference is set such that an interference intensity of the input light having the wavelength $\lambda$ is maximized, the optical path difference is k times the wavelength $\lambda$ where k is an integer excluding zero.

19. The control circuit according to claim 12, wherein the optical circuit is an optical modulator, and a modulation signal is applied to the signal Mach-Zehnder interferometer or at least one of the plurality of the Mach-Zehnder interferometers.

20. An optical circuit control method for controlling at least one optical path difference among optical path differences of two optical paths of a single Mach-Zehnder interferometer or each of a plurality of the Mach-Zehnder interferometers included in an optical circuit, the method comprising:

generating reference light having N types of wavelengths $\lambda_1$ to $\lambda_N$ each being different from a wavelength $\lambda$ of input light input to the optical circuit in parallel or in a time division manner where N is a natural number;

inputting the reference light to the optical circuit;

monitoring a light intensity of propagated input light which is the input light that has been propagated through the single Mach-Zehnder interferometer or a plurality of the Mach-Zehnder interferometers, and at least one of a light intensity of propagated reference light which is the reference light that has been propagated through the single Mach-Zehnder interferometer or a plurality of the Mach-Zehnder interferometers through which the propagated input light has been propagated, and a light intensity of light obtained by multiplexing the propagated input light and the propagated reference light; and performing control to correct the optical path difference on a basis of a light intensity $P(\lambda)$ of the propagated input light having the wavelength $\lambda$ and light intensities $P(\lambda_1)$ to $P(\lambda_N)$ of the propagated reference light having the N types of wavelengths $\lambda_1$ to $\lambda_N$, which are obtained using a monitoring result in the monitor step or on a basis of the light intensities $P(\lambda_1)$ to $P(\lambda_N)$ without using the light intensity $P(\lambda)$.

* * * * *